(12) United States Patent
Park et al.

(10) Patent No.: US 9,491,279 B2
(45) Date of Patent: Nov. 8, 2016

(54) MOBILE TERMINAL EQUIPPED WITH TOUCH SCREEN AND METHOD OF CONTROLLING THEREFOR

(71) Applicant: LG ELECTRONICS INC., Seoul (KR)

(72) Inventors: Hyungshin Park, Seoul (KR); Sunok Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/592,108

(22) Filed: Jan. 8, 2015

(65) Prior Publication Data
US 2016/0006862 A1  Jan. 7, 2016

(30) Foreign Application Priority Data
Jul. 7, 2014 (KR) .................. 10-2014-0084360

(51) Int. Cl.
| | |
|---|---|
| H04M 1/66 | (2006.01) |
| H04M 1/725 | (2006.01) |
| G06F 3/0488 | (2013.01) |
| G06F 1/16 | (2006.01) |
| G06F 21/36 | (2013.01) |

(52) U.S. Cl.
CPC .......... *H04M 1/72577* (2013.01); *G06F 1/165* (2013.01); *G06F 3/0488* (2013.01); *G06F 21/36* (2013.01); *H04M 1/66* (2013.01); *G06F 2221/2147* (2013.01); *H04M 2250/16* (2013.01); *H04M 2250/22* (2013.01)

(58) Field of Classification Search
CPC ............. H04M 1/72577; H04M 1/66; H04M 2250/16; H04M 2250/22; G06F 3/0488; G06F 21/36; G06F 1/165; G06F 2221/2147
USPC ................ 455/408, 410, 411; 726/2, 17, 19; 715/702, 767, 863, 799, 835, 847
See application file for complete search history.

(56) References Cited

U.S. PATENT DOCUMENTS

| | | |
|---|---|---|
| 2011/0130170 A1 | 6/2011 | Han et al. |
| 2014/0109018 A1 | 4/2014 | Casey et al. |
| 2014/0132481 A1 | 5/2014 | Bell et al. |
| 2014/0143859 A1* | 5/2014 | Linge ............ G06F 21/36 726/19 |

(Continued)

FOREIGN PATENT DOCUMENTS

GB    2503385 (A)    12/2013

OTHER PUBLICATIONS

Extended European Search Report for Application 15150737.3 dated Feb. 25, 2016.

(Continued)

*Primary Examiner* — Dhaval Patel
(74) *Attorney, Agent, or Firm* — KED & Associates LLP

(57) ABSTRACT

A mobile terminal is disclosed. A mobile terminal according to one embodiment of the preset invention includes a first touch screen including a sub display, a second touch screen including a main display, a touch recognition sensor configured to recognize a first touch input and a second touch input starting on a first position of the first touch screen, a memory configured to store the recognized first touch input and the second touch input as a unlock pattern and if a third touch input and a fourth touch input starting on a second position of the first touch screen are recognized by the touch recognition sensor, a controller configured to compare the unlock pattern stored in the memory with the recognized third touch input and the fourth touch input and execute unlock of the main display according to a result of the comparison.

17 Claims, 30 Drawing Sheets

(56) References Cited

U.S. PATENT DOCUMENTS

| | | | | |
|---|---|---|---|---|
| 2014/0317499 A1* | 10/2014 | Oh | G06F 3/04815 | 715/702 |
| 2015/0012886 A1* | 1/2015 | Lu | G06F 3/0488 | 715/835 |
| 2015/0017948 A1* | 1/2015 | Brenckle | G06F 21/31 | 455/411 |

OTHER PUBLICATIONS

Coolhunting: "T-Mobile G1 Google Android phone—gesture unlocking;" Sep. 23, 2008 XP054976380 Retrieved from the Internet: URL:https//ww.youtube.com/watch?y=Z1HsLRBGvdw (retrieved on Feb. 17, 2016).

* cited by examiner

FIG. 10

| divided area / Reference information | Size | Number |
|---|---|---|
| Size of touched finger floor (A) | a | b |
| Length of finger (B) | c | d |
| A+B | e | f |

(a)

(a)

(a)

(a)

(a)

(b)

MOBILE TERMINAL EQUIPPED WITH TOUCH SCREEN AND METHOD OF CONTROLLING THEREFOR

CROSS-REFERENCE TO RELATED APPLICATION

This application claims the benefit of the Korean Patent Application No. 10-2014-0084360, filed on Jul. 7, 2014, which is hereby incorporated by reference as if fully set forth herein.

BACKGROUND OF THE INVENTION

1. Field of the Invention

The present invention relates to a mobile terminal enabling a user to more conveniently use the mobile terminal and a method of controlling therefor.

2. Discussion of the Related Art

A terminal can be classified into a mobile/portable terminal and a stationary terminal in accordance with whether the terminal is capable of being moved. Again, the mobile terminal can be divided into a handheld (type) terminal and a vehicle mounted terminal.

A function of a mobile terminal is diversifying. For instance, the function of the mobile terminal includes such a function as data and audio communication, capturing a picture and a video using a camera, audio recording, playing a music file using a speaker system and outputting an image or a video on a display unit. Some of the terminals may have an additional function such as playing an electronic game or perform a function of a multimedia player. In particular, a latest mobile terminal can receive a multicast signal providing such visual contents as a broadcast, a video and a television program.

As the function of the terminal is diversified, the terminal is implemented in a form of a multimedia player equipped with multiple functions such as capturing a picture or a video, playing a music file or a video file, playing a game, receiving a broadcast and the like.

In order to support and increase the function of the terminal, it may consider improving a structural part and/or a software part of the terminal.

Recently, a discussion on a technology to add a display to a side of a mobile device is in progress. Hence, it is required to have a method of improving a legacy unlocking function.

SUMMARY OF THE INVENTION

An object of the present invention is to solve the aforementioned problem and a different problem.

Another object of the present invention is to define a protocol to more promptly process lock and unlock of a mobile device using a side display of the mobile device.

Another object of the present invention is to provide a technology enabling the number of blocks necessary for locking/unlocking of a side display to be automatically changed in a manner of recognizing an initial touch area touched by a user.

The other object of the present invention is to provide a technology enabling a specific application to be executed as fast as possible based on an initial touch area and information on a last pattern to unlock a mobile device.

Technical tasks obtainable from the present invention are non-limited the above mentioned technical tasks. And, other unmentioned technical tasks can be clearly understood from the following description by those having ordinary skill in the technical field to which the present invention pertains.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to one embodiment, a mobile terminal includes a first touch screen including a sub display, a second touch screen including a main display, a touch recognition sensor configured to recognize a first touch input and a second touch input starting on a first position of the first touch screen, a memory configured to store the recognized first touch input and the second touch input as a unlock pattern and if a third touch input and a fourth touch input starting on a second position of the first touch screen are recognized by the touch recognition sensor, a controller configured to compare the unlock pattern stored in the memory with the recognized third touch input and the fourth touch input and execute unlock of the main display according to a result of the comparison.

Advantage and effectiveness of a mobile terminal according to the present invention and a method of controlling therefor are described in the following.

According to at least one of embodiments of the present invention, it is able to define a protocol enabling lock and unlock of a mobile device to be more promptly processed using a side display of the mobile device.

According to at least one of embodiments of the present invention, it is able to provide a technology enabling the number of blocks necessary for locking/unlocking of a side display to be automatically changed in a manner of recognizing an initial touch area touched by a user.

According to at least one of embodiments of the present invention, it is able to provide a technology enabling a specific application to be executed as fast as possible based on an initial touch area and information on a last pattern to unlock a mobile device.

An additional scope to which the present invention is applicable is to be clearly understood by following detail explanation. Yet, since various changes and modifications within an idea and a scope of the present invention can be clearly understood by those skilled in the art, detailed explanation and such a specific embodiment as a preferred embodiment of the present invention should be understood as just a given example.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 10 is a diagram for an example of a database usable for implementing embodiment of FIG. 9;

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
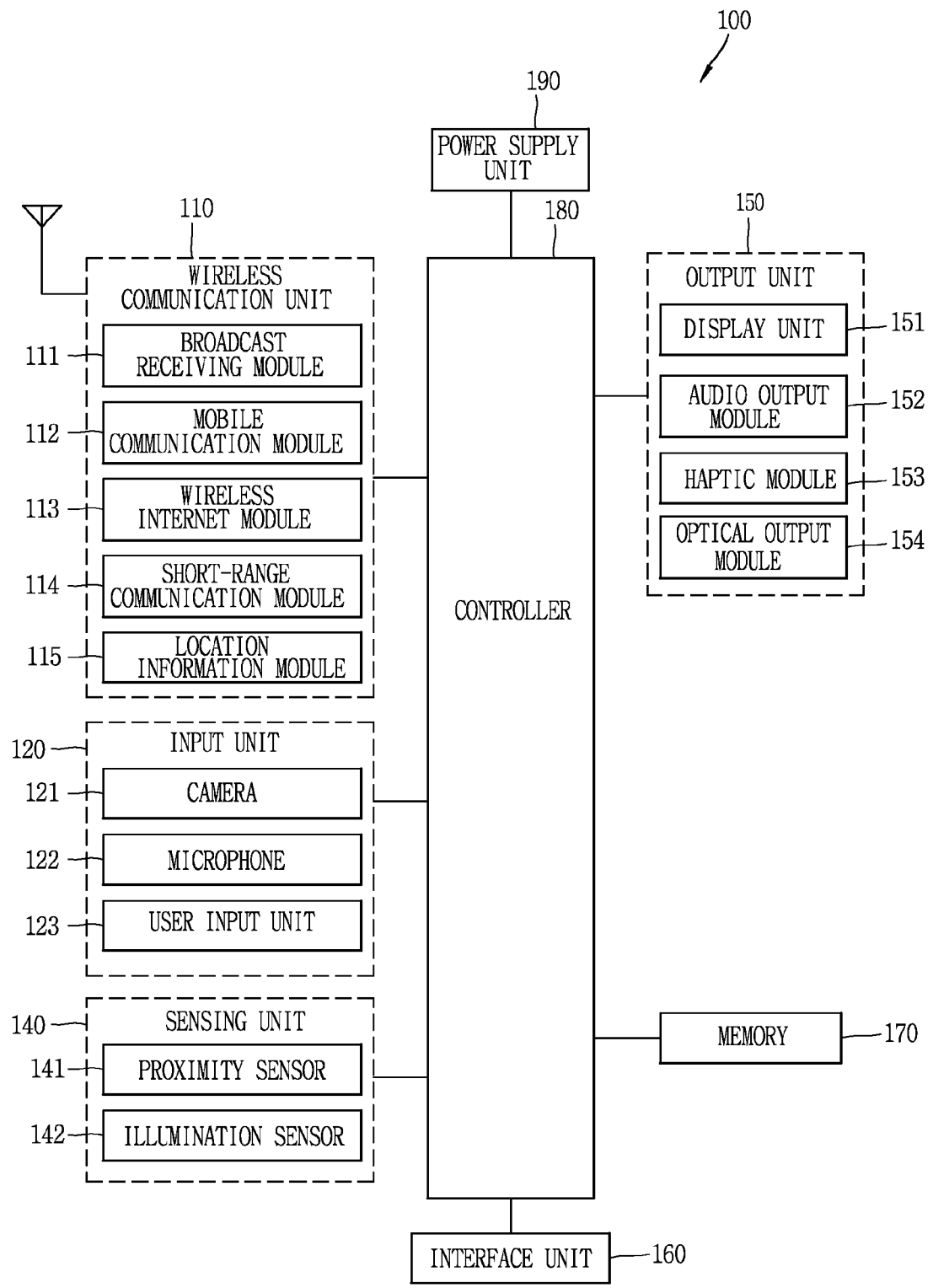
FIG. 1A is a block diagram of a mobile terminal in accordance with the present disclosure.
Figure 1B:
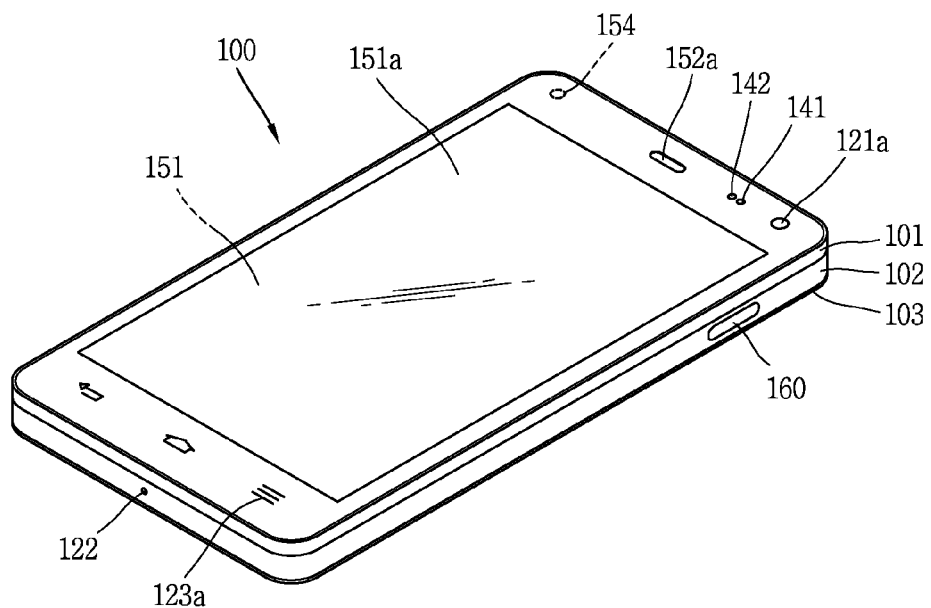
FIGS. 1B and 1C are conceptual views of one example of the mobile terminal, viewed from different directions.
Figure 1C:
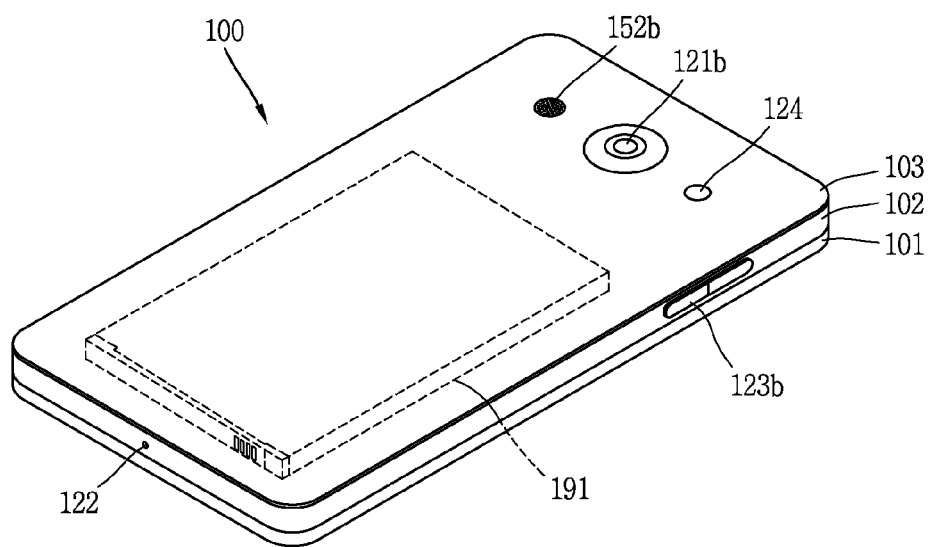

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be implemented using a server or system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151*a* and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123*a* may be located on another surface of the terminal body, and the second audio output module 152*b* may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151*a* and a display on a rear surface of the window 151*a*, or a metal wire which is patterned directly on the rear surface of the window 151*a*. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123*a*.

The first audio output module 152*a* may be implemented in the form of a speaker to output voice audio, alarm sounds, multimedia audio reproduction, and the like.

The window 151*a* of the display unit 151 will typically include an aperture to permit audio generated by the first audio output module 152*a* to pass. One alternative is to allow audio to be released along an assembly gap between the structural bodies (for example, a gap between the window 151*a* and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121*a* can process image frames such as still or moving images obtained by the image sensor in a capture mode or a video call mode. The processed image frames can then be displayed on the display unit 151 or stored in the memory 170.

The first and second manipulation units 123*a* and 123*b* are examples of the user input unit 123, which may be manipulated by a user to provide input to the mobile terminal 100. The first and second manipulation units 123*a* and 123*b* may also be commonly referred to as a manipulating portion, and may employ any tactile method that allows the user to perform manipulation such as touch, push, scroll, or the like. The first and second manipulation units 123*a* and 123*b* may also employ any non-tactile method that allows the user to perform manipulation such as proximity touch, hovering, or the like.

FIG. 1B illustrates the first manipulation unit 123*a* as a touch key, but possible alternatives include a mechanical key, a push key, a touch key, and combinations thereof.

Input received at the first and second manipulation units 123*a* and 123*b* may be used in various ways. For example, the first manipulation unit 123*a* may be used by the user to provide an input to a menu, home key, cancel, search, or the like, and the second manipulation unit 123*b* may be used by the user to provide an input to control a volume level being output from the first or second audio output modules 152*a* or 152*b*, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152*a* or 152*b*, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123*a* in the rear input unit. As such, in situations where the first manipulation unit 123*a* is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 2:
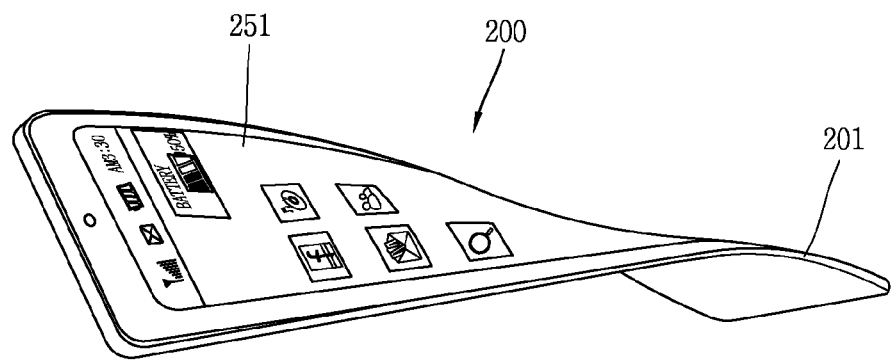
FIG. 2 is a conceptual view of a deformable mobile terminal according to an alternative embodiment of the present disclosure.

FIG. 2 is a conceptual view of a deformable mobile terminal according to an alternative embodiment of the present invention. In this figure, mobile terminal 200 is shown having display unit 251, which is a type of display that is deformable by an external force. This deformation, which includes display unit 251 and other components of mobile terminal 200, may include any of curving, bending, folding, twisting, rolling, and combinations thereof. The deformable display unit 251 may also be referred to as a "flexible display unit." In some implementations, the flexible display unit 251 may include a general flexible display, electronic paper (also known as e-paper), and combinations thereof. In general, mobile terminal 200 may be configured to include features that are the same or similar to that of mobile terminal 100 of FIGS. 1A-1C.

The flexible display of mobile terminal 200 is generally formed as a lightweight, non-fragile display, which still exhibits characteristics of a conventional flat panel display, but is instead fabricated on a flexible substrate which can be deformed as noted previously.

The term e-paper may be used to refer to a display technology employing the characteristic of a general ink, and is different from the conventional flat panel display in view of using reflected light. E-paper is generally understood as changing displayed information using a twist ball or via electrophoresis using a capsule.

When in a state that the flexible display unit 251 is not deformed (for example, in a state with an infinite radius of curvature and referred to as a first state), a display region of the flexible display unit 251 includes a generally flat surface. When in a state that the flexible display unit 251 is deformed from the first state by an external force (for example, a state with a finite radius of curvature and referred to as a second state), the display region may become a curved surface or a bent surface. As illustrated, information displayed in the second state may be visual information output on the curved surface. The visual information may be realized in such a manner that a light emission of each unit pixel (sub-pixel) arranged in a matrix configuration is controlled independently. The unit pixel denotes an elementary unit for representing one color.

According to one alternative embodiment, the first state of the flexible display unit 251 may be a curved state (for example, a state of being curved from up to down or from right to left), instead of being in flat state. In this embodiment, when an external force is applied to the flexible display unit 251, the flexible display unit 251 may transition to the second state such that the flexible display unit is deformed into the flat state (or a less curved state) or into a more curved state.

If desired, the flexible display unit 251 may implement a flexible touch screen using a touch sensor in combination with the display. When a touch is received at the flexible touch screen, the controller 180 can execute certain control corresponding to the touch input. In general, the flexible touch screen is configured to sense touch and other input while in both the first and second states.

One option is to configure the mobile terminal 200 to include a deformation sensor which senses the deforming of the flexible display unit 251. The deformation sensor may be included in the sensing unit 140.

The deformation sensor may be located in the flexible display unit 251 or the case 201 to sense information related to the deforming of the flexible display unit 251. Examples of such information related to the deforming of the flexible display unit 251 may be a deformed direction, a deformed degree, a deformed position, a deformed amount of time, an acceleration that the deformed flexible display unit 251 is restored, and the like. Other possibilities include most any type of information which can be sensed in response to the curving of the flexible display unit or sensed while the flexible display unit 251 is transitioning into, or existing in, the first and second states.

In some embodiments, controller 180 or other component can change information displayed on the flexible display unit 251, or generate a control signal for controlling a function of the mobile terminal 200, based on the information related to the deforming of the flexible display unit 251. Such information is typically sensed by the deformation sensor.

The mobile terminal 200 is shown having a case 201 for accommodating the flexible display unit 251. The case 201 can be deformable together with the flexible display unit 251, taking into account the characteristics of the flexible display unit 251.

A battery (not shown in this figure) located in the mobile terminal 200 may also be deformable in cooperation with the flexible display unit 261, taking into account the characteristic of the flexible display unit 251. One technique to implement such a battery is to use a stack and folding method of stacking battery cells.

The deformation of the flexible display unit 251 not limited to perform by an external force. For example, the flexible display unit 251 can be deformed into the second state from the first state by a user command, application command, or the like.

In accordance with still further embodiments, a mobile terminal may be configured as a device which is wearable on a human body. Such devices go beyond the usual technique of a user grasping the mobile terminal using their hand. Examples of the wearable device include a smart watch, a smart glass, a head mounted display (HMD), and the like.

A typical wearable device can exchange data with (or cooperate with) another mobile terminal 100. In such a device, the wearable device generally has functionality that is less than the cooperating mobile terminal. For instance, the short-range communication module 114 of a mobile terminal 100 may sense or recognize a wearable device that is near-enough to communicate with the mobile terminal. In addition, when the sensed wearable device is a device which is authenticated to communicate with the mobile terminal 100, the controller 180 may transmit data processed in the mobile terminal 100 to the wearable device via the short-range communication module 114, for example. Hence, a user of the wearable device can use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

Figure 3:
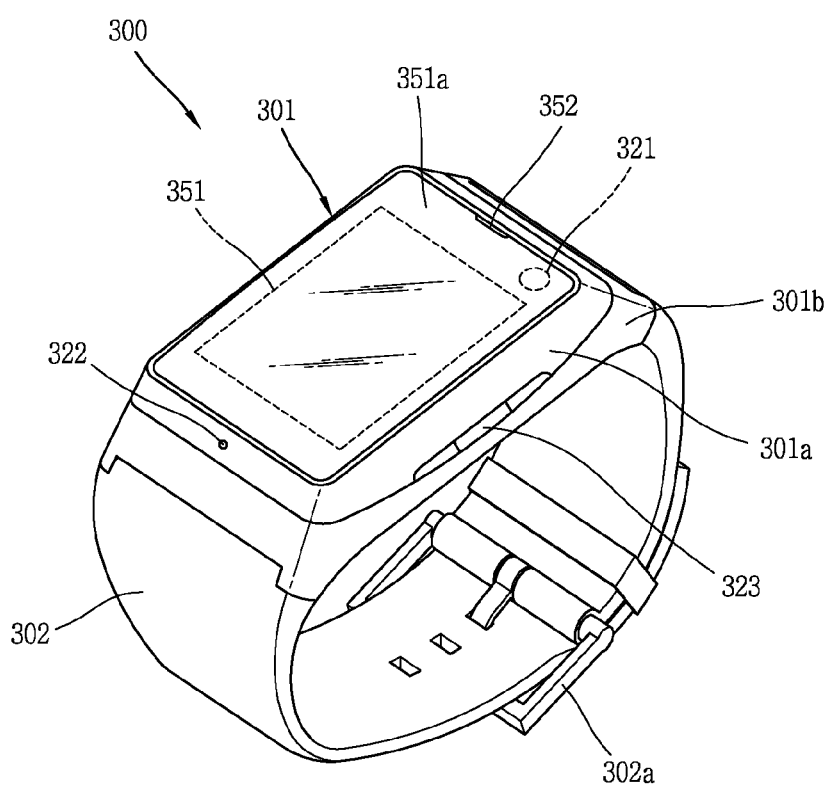
FIG. 3 is a conceptual view of a wearable mobile terminal according to another alternative embodiment of the present disclosure.

FIG. 3 is a perspective view illustrating one example of a watch-type mobile terminal 300 in accordance with another exemplary embodiment. As illustrated in FIG. 3, the watch-type mobile terminal 300 includes a main body 301 with a display unit 351 and a band 302 connected to the main body 301 to be wearable on a wrist. In general, mobile terminal 300 may be configured to include features that are the same or similar to that of mobile terminal 100 of FIGS. 1A-1C.

The main body 301 may include a case having a certain appearance. As illustrated, the case may include a first case 301a and a second case 301b cooperatively defining an inner space for accommodating various electronic components. Other configurations are possible. For instance, a single case may alternatively be implemented, with such a case being configured to define the inner space, thereby implementing a mobile terminal 300 with a uni-body.

The watch-type mobile terminal 300 can perform wireless communication, and an antenna for the wireless communication can be installed in the main body 301. The antenna may extend its function using the case. For example, a case including a conductive material may be electrically connected to the antenna to extend a ground area or a radiation area.

The display unit 351 is shown located at the front side of the main body 301 so that displayed information is viewable to a user. In some embodiments, the display unit 351 includes a touch sensor so that the display unit can function as a touch screen. As illustrated, window 351a is positioned on the first case 301a to form a front surface of the terminal body together with the first case 301a.

The illustrated embodiment includes audio output module 352, a camera 321, a microphone 322, and a user input unit 323 positioned on the main body 301. When the display unit 351 is implemented as a touch screen, additional function keys may be minimized or eliminated. For example, when the touch screen is implemented, the user input unit 323 may be omitted.

The band 302 is commonly worn on the user's wrist and may be made of a flexible material for facilitating wearing of the device. As one example, the band 302 may be made of fur, rubber, silicon, synthetic resin, or the like. The band 302 may also be configured to be detachable from the main body 301. Accordingly, the band 302 may be replaceable with various types of bands according to a user's preference.

In one configuration, the band 302 may be used for extending the performance of the antenna. For example, the band may include therein a ground extending portion (not shown) electrically connected to the antenna to extend a ground area.

The band 302 may include fastener 302a. The fastener 302a may be implemented into a buckle type, a snap-fit hook structure, a Velcro® type, or the like, and include a flexible section or material. The drawing illustrates an example that the fastener 302a is implemented using a buckle.

Figure 4:
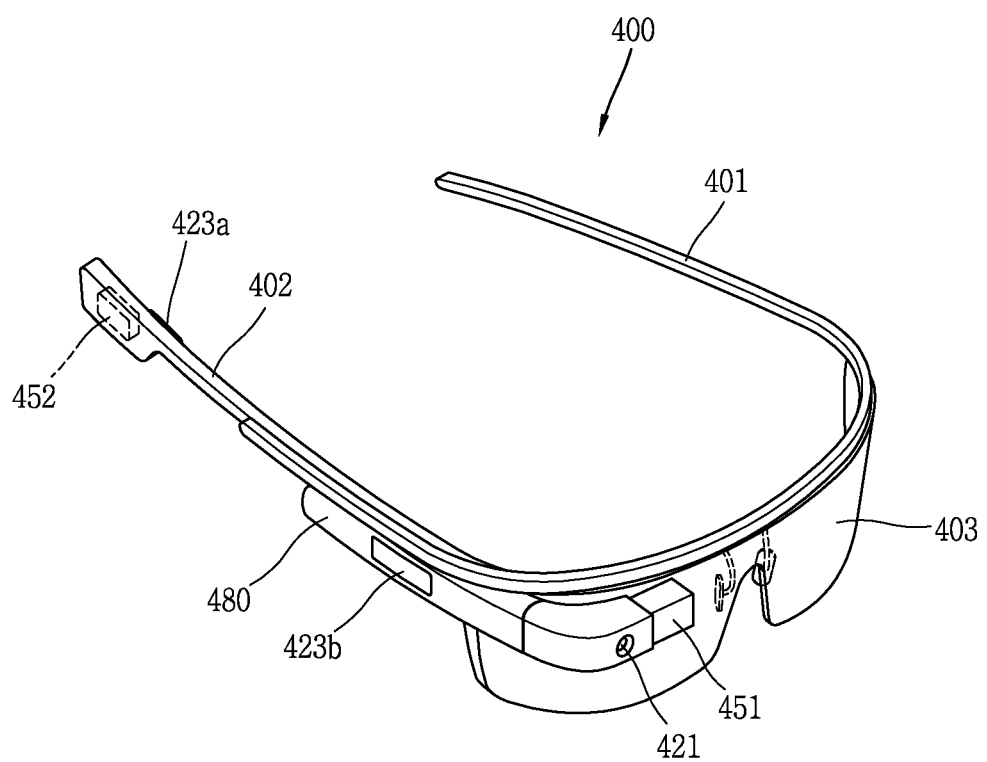
FIG. 4 is a conceptual view of a wearable mobile terminal according to another alternative embodiment of the present disclosure.

FIG. 4 is a perspective view illustrating one example of a glass-type mobile terminal 400 according to another exemplary embodiment. The glass-type mobile terminal 400 can be wearable on a head of a human body and provided with a frame (case, housing, etc.) therefor. The frame may be made of a flexible material to be easily worn. The frame of mobile terminal 400 is shown having a first frame 401 and a second frame 402, which can be made of the same or different materials. In general, mobile terminal 400 may be configured to include features that are the same or similar to that of mobile terminal 100 of FIGS. 1A-1C.

The frame may be supported on the head and defines a space for mounting various components. As illustrated, electronic components, such as a control module 480, an audio output module 452, and the like, may be mounted to the frame part. Also, a lens 403 for covering either or both of the left and right eyes may be detachably coupled to the frame part.

The control module 480 controls various electronic components disposed in the mobile terminal 400. The control module 480 may be understood as a component corresponding to the aforementioned controller 180. FIG. 4 illustrates that the control module 480 is installed in the frame part on one side of the head, but other locations are possible.

The display unit 451 may be implemented as a head mounted display (HMD). The HMD refers to display techniques by which a display is mounted to a head to show an image directly in front of a user's eyes. In order to provide an image directly in front of the user's eyes when the user wears the glass-type mobile terminal 400, the display unit 451 may be located to correspond to either or both of the left and right eyes. FIG. 4 illustrates that the display unit 451 is located on a portion corresponding to the right eye to output an image viewable by the user's right eye.

The display unit 451 may project an image into the user's eye using a prism. Also, the prism may be formed from optically transparent material such that the user can view both the projected image and a general visual field (a range that the user views through the eyes) in front of the user.

In such a manner, the image output through the display unit 451 may be viewed while overlapping with the general visual field. The mobile terminal 400 may provide an augmented reality (AR) by overlaying a virtual image on a realistic image or background using the display.

The camera 421 may be located adjacent to either or both of the left and right eyes to capture an image. Since the camera 421 is located adjacent to the eye, the camera 421 can acquire a scene that the user is currently viewing. The camera 421 may be positioned at most any location of the mobile terminal. In some embodiments, multiple cameras 421 may be utilized. Such multiple cameras 421 may be used to acquire a stereoscopic image.

The glass-type mobile terminal 400 may include user input units 423*a* and 423*b*, which can each be manipulated by the user to provide an input. The user input units 423*a* and 423*b* may employ techniques which permit input via a tactile input. Typical tactile inputs include a touch, push, or the like. The user input units 423*a* and 423*b* are shown operable in a pushing manner and a touching manner as they are located on the frame part and the control module 480, respectively.

If desired, mobile terminal 400 may include a microphone which processes input sound into electric audio data, and an audio output module 452 for outputting audio. The audio output module 452 may be configured to produce audio in a general audio output manner or an osteoconductive manner. When the audio output module 452 is implemented in the osteoconductive manner, the audio output module 452 may be closely adhered to the head when the user wears the mobile terminal 400 and vibrate the user's skull to transfer sounds.

A communication system which is operable with the variously described mobile terminals will now be described in more detail. Such a communication system may be configured to utilize any of a variety of different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (including, Long Term Evolution (LTE), LTE-A (Long Term Evolution-Advanced)), Global System for Mobile Communications (GSM), and the like.

By way of a non-limiting example only, further description will relate to a CDMA communication system, but such teachings apply equally to other system types including a CDMA wireless communication system as well as OFDM (Orthogonal Frequency Division Multiplexing) wireless communication system. A CDMA wireless communication system generally includes one or more mobile terminals (MT or User Equipment, UE) 100, one or more base stations (BSs, NodeB, or evolved NodeB), one or more base station controllers (BSCs), and a mobile switching center (MSC). The MSC is configured to interface with a conventional Public Switched Telephone Network (PSTN) and the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the CDMA wireless communication system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111 of FIG. 1A is typically configured inside the mobile terminal 100 to receive broadcast signals transmitted by the BT.

Global Positioning System (GPS) satellites for locating the position of the mobile terminal 100, for example, may cooperate with the CDMA wireless communication system. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites may alternatively or additionally be configured to provide satellite DMB transmissions.

The location information module 115 is generally configured to detect, calculate, or otherwise identify a position of the mobile terminal. As an example, the location information module 115 may include a Global Position System (GPS) module, a Wi-Fi module, or both. If desired, the location information module 115 may alternatively or additionally function with any of the other modules of the wireless communication unit 110 to obtain data related to the position of the mobile terminal.

A typical GPS module 115 can measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites.

Furthermore, the GPS module can acquire speed information in real time to calculate a current position. Sometimes, accuracy of a measured position may be compromised when the mobile terminal is located in a blind spot of satellite signals, such as being located in an indoor space. In order to minimize the effect of such blind spots, an alternative or supplemental location technique, such as Wi-Fi Positioning System (WPS), may be utilized.

The Wi-Fi positioning system (WPS) refers to a location determination technology based on a wireless local area network (WLAN) using Wi-Fi as a technology for tracking the location of the mobile terminal 100. This technology typically includes the use of a Wi-Fi module in the mobile terminal 100 and a wireless access point for communicating with the Wi-Fi module.

The Wi-Fi positioning system may include a Wi-Fi location determination server, a mobile terminal, a wireless access point (AP) connected to the mobile terminal, and a database stored with wireless AP information.

The mobile terminal connected to the wireless AP may transmit a location information request message to the Wi-Fi location determination server. The Wi-Fi location determination server extracts the information of the wireless AP connected to the mobile terminal 100, based on the location information request message (or signal) of the mobile terminal 100. The information of the wireless AP may be transmitted to the Wi-Fi location determination server through the mobile terminal 100, or may be transmitted to the Wi-Fi location determination server from the wireless AP.

The information of the wireless AP extracted based on the location information request message of the mobile terminal 100 may include one or more of media access control (MAC) address, service set identification (SSID), received signal strength indicator (RSSI), reference signal received Power (RSRP), reference signal received quality (RSRQ), channel information, privacy, network type, signal strength, noise strength, and the like.

The Wi-Fi location determination server may receive the information of the wireless AP connected to the mobile terminal 100 as described above, and may extract wireless AP information corresponding to the wireless AP connected to the mobile terminal from the pre-established database. The information of any wireless APs stored in the database may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like. In order to remove wireless APs provided using a mobile AP or an illegal MAC address during a location determining process, the Wi-Fi location determination server may extract only a predetermined number of wireless AP information in order of high RSSI.

Then, the Wi-Fi location determination server may extract (analyze) location information of the mobile terminal 100 using at least one wireless AP information extracted from the database.

A method for extracting (analyzing) location information of the mobile terminal 100 may include a Cell-ID method, a fingerprint method, a trigonometry method, a landmark method, and the like.

The Cell-ID method is used to determine a position of a wireless AP having the largest signal strength, among peripheral wireless AP information collected by a mobile terminal, as a position of the mobile terminal. The Cell-ID method is an implementation that is minimally complex, does not require additional costs, and location information can be rapidly acquired. However, in the Cell-ID method, the precision of positioning may fall below a desired threshold when the installation density of wireless APs is low.

The fingerprint method is used to collect signal strength information by selecting a reference position from a service area, and to track a position of a mobile terminal using the signal strength information transmitted from the mobile terminal based on the collected information. In order to use the fingerprint method, it is common for the characteristics of radio signals to be pre-stored in the form of a database.

The trigonometry method is used to calculate a position of a mobile terminal based on a distance between coordinates of at least three wireless APs and the mobile terminal. In order to measure the distance between the mobile terminal and the wireless APs, signal strength may be converted into distance information, Time of Arrival (ToA), Time Difference of Arrival (TDoA), Angle of Arrival (AoA), or the like may be taken for transmitted wireless signals.

The landmark method is used to measure a position of a mobile terminal using a known landmark transmitter.

In addition to these position location methods, various algorithms may be used to extract (analyze) location information of a mobile terminal. Such extracted location information may be transmitted to the mobile terminal 100 through the Wi-Fi location determination server, thereby acquiring location information of the mobile terminal 100.

The mobile terminal 100 can acquire location information by being connected to at least one wireless AP. The number of wireless APs required to acquire location information of the mobile terminal 100 may be variously changed according to a wireless communication environment within which the mobile terminal 100 is positioned.

As previously described with regard to FIG. 1A, the mobile terminal may be configured to include short-range communication techniques such as Bluetooth™, Radio Frequency Identification (RFID), Infrared Data Association (IrDA), Ultra Wideband (UWB), ZigBee, Near Field Communication (NFC), Wireless USB (Wireless Universal Serial Bus), and the like.

A typical NFC module provided at the mobile terminal supports short-range wireless communication, which is a non-contactable type of communication between mobile terminals and generally occurs within about 10 cm. The NFC module may operate in one of a card mode, a reader mode, or a P2P mode. The mobile terminal 100 may further include a security module for storing card information, in order to operate the NFC module in a card mode. The security module may be a physical medium such as Universal Integrated Circuit Card (UICC) (e.g., a Subscriber Identification Module (SIM) or Universal SIM (USIM)), a secure micro SD and a sticker, or a logical medium (e.g., embedded Secure Element (SE)) embedded in the mobile terminal. Single Wire Protocol (SWP)-based data exchange may be performed between the NFC module and the security module.

In a case where the NFC module operates in a card mode, the mobile terminal may transmit card information on a general IC card to the outside. More specifically, if a mobile terminal having card information on a payment card (e.g, a credit card or a bus card) approaches a card reader, a short-range mobile payment may be executed. As another example, if a mobile terminal which stores card information on an entrance card approaches an entrance card reader, an entrance approval procedure may start. A card such as a credit card, a traffic card, or an entrance card may be included in the security module in the form of applet, and the security module may store card information on the card mounted therein. Card information for a payment card may include any of a card number, a remaining amount and usage history, and the like. Card information of an entrance card may include any of a user's name, a user's number (e.g., undergraduate number or staff number), an entrance history, and the like.

When the NFC module operates in a reader mode, the mobile terminal can read data from an external tag. The data received from the external tag by the mobile terminal may be coded into the NFC Data Exchange Format defined by the NFC Forum. The NFC Forum generally defines four record types. More specifically, the NFC Forum defines four Record Type Definitions (RTDs) such as smart poster, text, Uniform Resource Identifier (URI), and general control. If the data received from the external tag is a smart poster type, the controller may execute a browser (e.g., Internet browser). If the data received from the external tag is a text type, the controller may execute a text viewer. If the data received from the external tag is a URI type, the controller may execute a browser or originate a call. If the data received from the external tag is a general control type, the controller may execute a proper operation according to control content.

In some cases in which the NFC module operates in a P2P (Peer-to-Peer) mode, the mobile terminal can execute P2P communication with another mobile terminal. In this case, Logical Link Control Protocol (LLCP) may be applied to the P2P communication. For P2P communication, connection may be generated between the mobile terminal and another mobile terminal. This connection may be categorized as a connectionless mode which ends after one packet is switched, and a connection-oriented mode in which packets are switched consecutively. For a typical P2P communication, data such as an electronic type name card, address information, a digital photo and a URL, a setup parameter for Bluetooth connection, Wi-Fi connection, etc. may be switched. The P2P mode can be effectively utilized in switching data of a small capacity, because an available distance for NFC communication is relatively short.

Further preferred embodiments will be described in more detail with reference to additional drawing figures. It is understood by those skilled in the art that the present features can be embodied in several forms without departing from the characteristics thereof.

A display unit 151 of a mobile terminal 100 according to the present invention can include a front output unit exposed to the front side of the mobile terminal and at least one side output unit exposed to the side of the mobile terminal.

Figure 5:
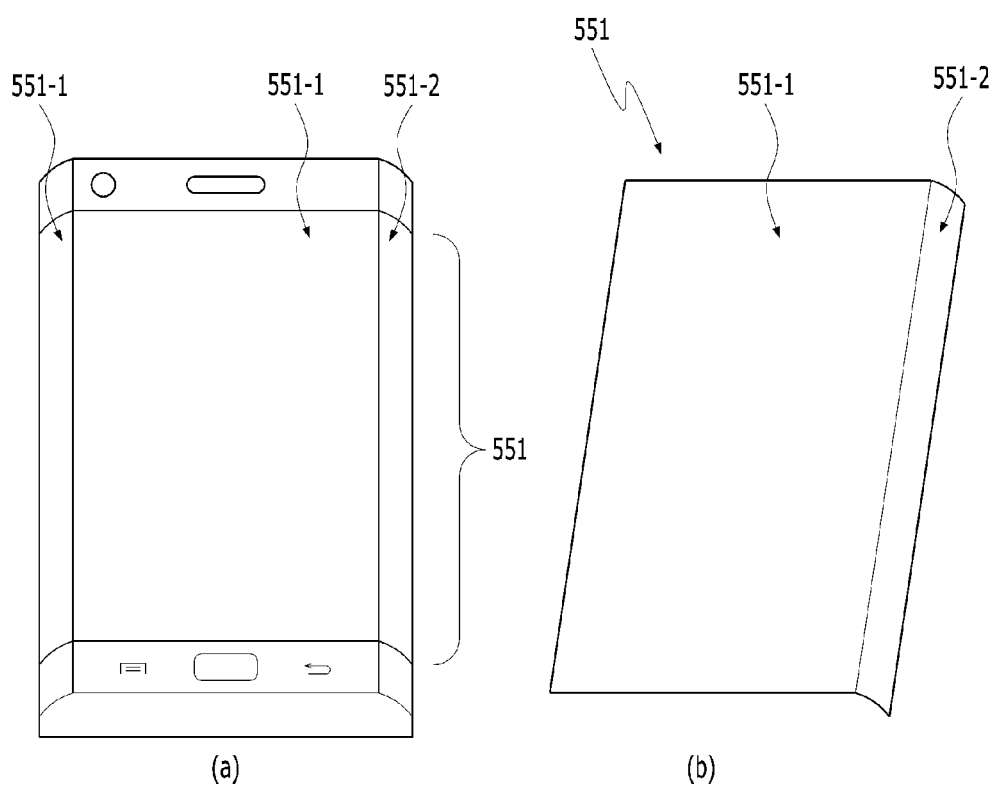
FIG. 5 is a diagram for explaining an example of a front output unit and a side output unit of a mobile terminal related to the present invention.

As an example, FIG. 5 is a diagram for explaining an example of a front output unit and a side output unit of a mobile terminal related to the present invention. As shown in an example of FIG. 5 (a), the front output unit 551-1 may correspond to a display area exposed to the front side of the mobile terminal and the side output unit 551-2 may correspond to a display area exposed to the side of the mobile terminal.

The front output unit 551-1 and the side output unit 551-2 can be implemented by separate electronic components, respectively. On the contrary, if the display unit corresponds to a flexible display capable of being freely bent, the front output unit 551-1 and the side output unit 551-2 can be formed in a manner of bending at least one end of the flexible display.

As an example, FIG. 5 (b) shows an example that the front output unit 551-1 and the side output unit 551-2 are formed in a manner of bending at least one end of the flexible display. As shown in the example of FIG. 5 (b), when at least one end of the flexible display unit 551 is bent, a flat area and a bent area form the front output unit 551-1 and the side output unit 551-2, respectively.

As shown in the example of FIG. 5 (a), the side output unit 551-2 may exist in both a left side and a right side of the mobile terminal. Or, as shown in the example of FIG. 5 (b), the side output unit 551-2 may exist in either the left side or the right side of the mobile terminal.

The present invention can be more easily implemented when the display unit 551 is implemented by a touch screen. Hence, in explaining the present invention, assume that the display unit 551 corresponds to a touch screen. Moreover, the present invention is associated with unlock of the display unit 551.

Meanwhile, for clarity, although such a terminology as a first process to a third process and the like is used in FIG. 6 to FIG. 27, it is apparent that a scope of right of the present invention is determined based on items written on the claims. For instance, changing orders of processes described in the following or deleting a part of the processes also belongs to the scope of right of the present invention.

Figure 6:
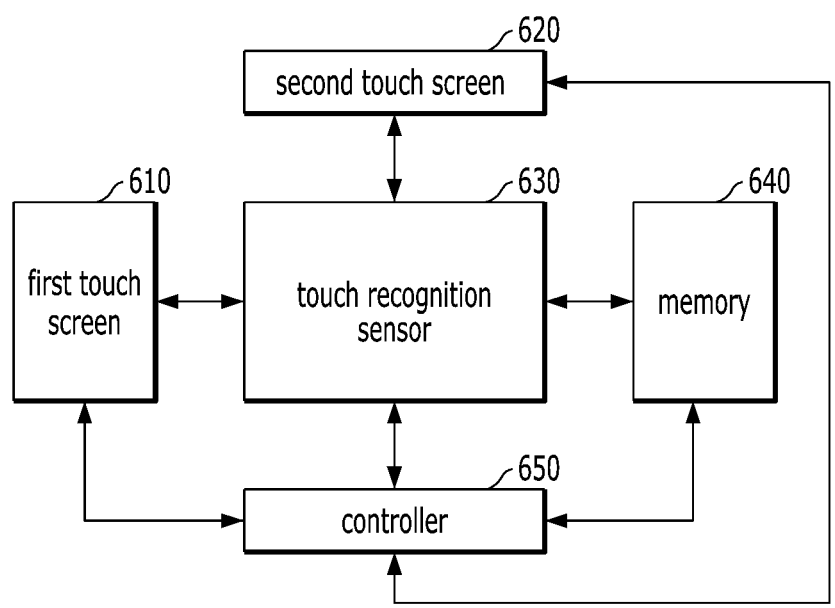
FIG. 6 is a diagram for an inside module of a mobile terminal according to one embodiment of the present invention.

FIG. 6 is a diagram for an inside module of a mobile terminal according to one embodiment of the present invention.

As shown in FIG. 6, a mobile terminal 600 according to one embodiment of the present invention includes a first touch screen 610, a second touch screen 620, a touch recognition sensor 630, a memory 640, a controller 650 and the like. For instance, the first touch screen 610 corresponds to an area 551-2 of the side surface shown in FIG. 5 and the second touch screen 620 corresponds to an area 551-1 of the front side shown in FIG. 5.

More specifically, the first touch screen 610 includes a sub display and the second touch screen 620 includes a main display. The first touch screen 610 and the second touch screen 620 have a direction different from each other.

The touch recognition sensor 630 recognizes a first touch input and a second touch input starting on a first position of the first touch screen 610 and the memory 640 stores the recognized first touch input and the second touch input as a unlock pattern.

If a third touch input and a fourth touch input staring on a second position of the first touch screen 610 are recognized by the touch recognition sensor 630, the controller 650 compares the unlock pattern stored in the memory 640 with the recognized third touch input and the fourth touch input and executes unlock of the main display according to a result of the comparison.

Meanwhile, the first touch input and the second touch input may correspond to a lock pattern and the third touch input and the fourth touch input may correspond to a unlock pattern.

According to a different embodiment of the present invention, the recognized first touch input includes direction information and distance information and the recognized second touch input includes direction information and distance information. Yet, the direction information of the first touch input and the direction information of the second touch input are designed to be directly opposite to each other. Moreover, the distance information is divided into at least two or more units for example.

If the touch recognition sensor 630 recognizes the third touch input on an end point of the first touch screen 610, the controller 650 is configured to add up distance information of a newly touched third-a touch input and distance information of the previously touched third touch input.

Moreover, if the touch recognition sensor 630 recognizes the fourth touch input on the end point of the first touch screen 610, the controller 650 is configured to add up distance information of a newly touched fourth-a touch input and distance information of the previously touched fourth touch input. In relation to this, it shall be described in more detail with reference to FIG. 20 to FIG. 22.

According to a further different embodiment of the present invention, if an application adjacent to a second position of the first touch screen is displayed on a main display of the second touch screen 620, the controller is configured to execute the application after unlock is executed or at the same time of the unlock. In relation to this, it shall be described in more detail with reference to FIG. 23 and FIG. 24.

Moreover, the controller 650 outputs the number of units respectively corresponding to each of the distance information of the first to fourth touch input on a first area of the main display and outputs a progressive bar depending on each of the distance information and direction information of the first to fourth touch input on a second area of the main display in a manner of controlling the second touch screen 620. In relation to this, it shall be described in more detail with reference to FIG. 14 and FIG. 15.

Figure 7:
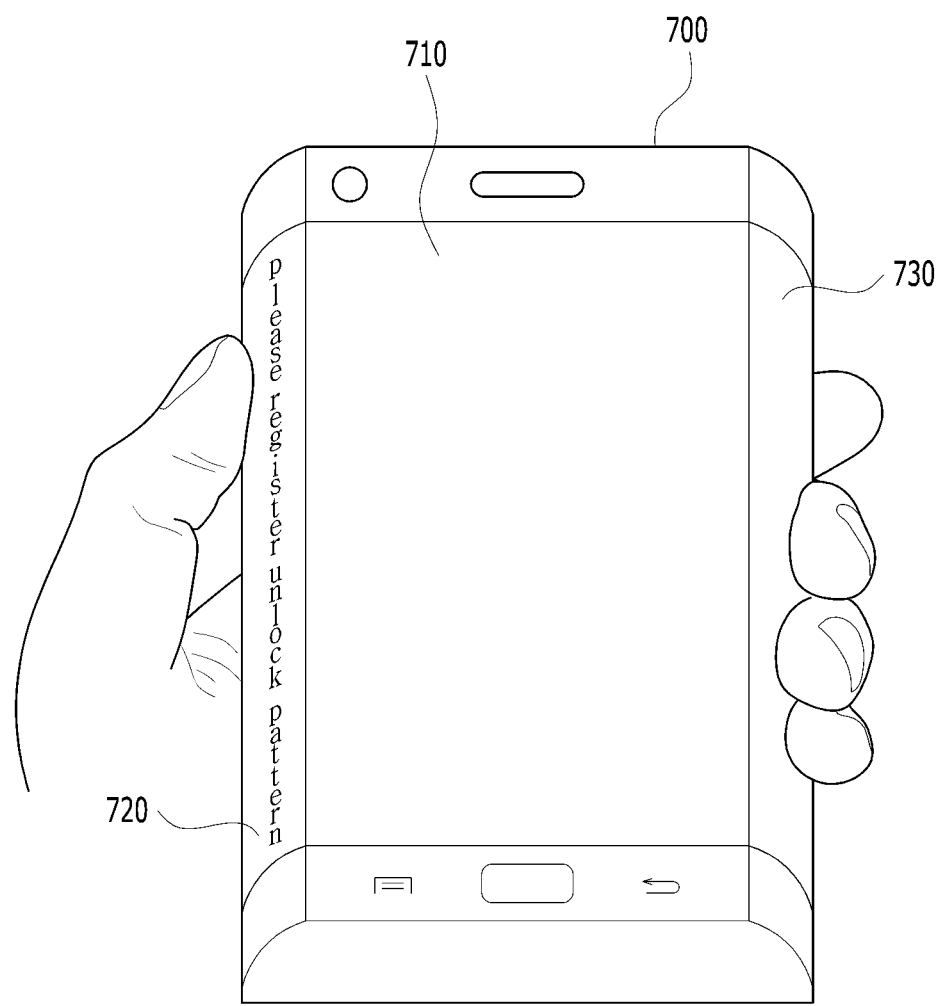
FIG. 7 is a schematic diagram for an exterior of a mobile terminal according to one embodiment of the present invention.

FIG. 7 is a schematic diagram for an exterior of a mobile terminal according to one embodiment of the present invention.

As mentioned earlier with reference to FIG. 5 and FIG. 6, one embodiment of the present invention is related to a mobile device equipped with a flexible display or a bent display.

As shown in FIG. 7, a mobile terminal (or a mobile device) 700 according to one embodiment of the present invention is equipped with a first touch screen 720/730 including a sub display and a second touch screen 710 including a main display. If a touch of a user is detected on the first touch screen 720, various messages are displayed. Registering an unlock pattern to be used on the first touch screen 720 by the user in a manner of operating the second touch screen 710 also belongs to the scope of right of the present invention.

Meanwhile, an angle between the first touch screen 720 and the second touch screen 710 is designed to be an angle greater than 0 degree and less than 90 degrees for example. Moreover, as shown in FIG. 7, the first touch screen can be implemented by two screens 720/730 or can be implemented by a single screen only.

If the first touch screen is designed as shown in FIG. 7, unlike the related art, a user does not need to use both hands. The user can unlock the mobile terminal by one hand. Hence, data processing speed may be enhanced as well.

In the following, a process of registering a touch pattern to lock a mobile terminal is explained in detail.

Figure 8:
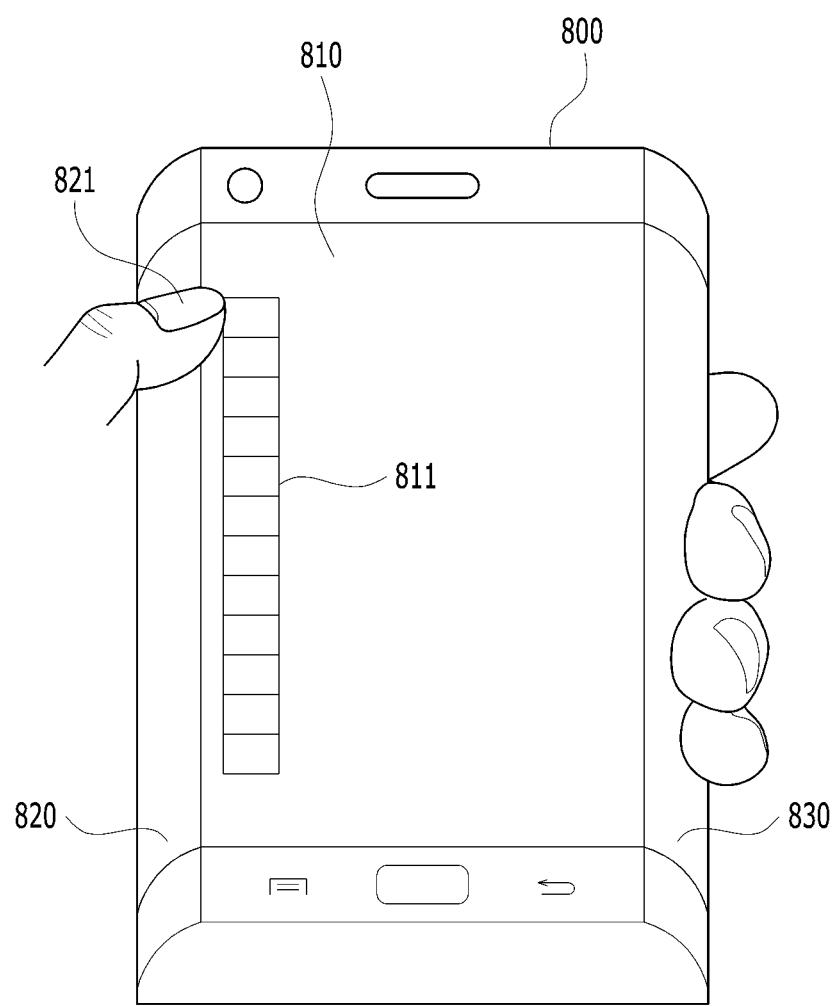
FIG. 8 is a diagram for an example of a first process making an attempt at lock of a mobile device using a side surface of the mobile terminal according to one embodiment of the present invention.

FIG. 8 is a diagram for an example of a first process making an attempt at lock of a mobile device using a side surface of the mobile terminal according to one embodiment of the present invention. In this case, the side surface corresponds to a first touch screen 820 shown in FIG. 8. And, in FIG. 8, assume a case that a process of registering a touch pattern to lock the mobile terminal is initially executed.

As shown in FIG. 8, a mobile terminal 800 includes both a first touch screen 820 and a second touch screen 810.

Moreover, the mobile terminal is designed to display a plurality of blocks 811 used for registering a touch pattern on the second touch screen 810 on the basis of a point 821 of the first touch screen 820 on which a touch is touched. Of course, displaying a plurality of the blocks on the first touch screen 820 also belongs to the scope of right of the present invention.

When a plurality of the blocks 811 are designed to be displayed from an area corresponding to the point 821 on which a user initially touches, the user can continuously input a touch pattern. Of course, displaying a plurality of the blocks 811 from an area irrespective of the point on which the user initially touches also belongs to the scope of right of the present invention.

Although 10 blocks 811 are shown in FIG. 8 as an example, a shape of the blocks and the number of the blocks can be modified according to information stored in the memory in advance or information inputted by a user.

Figure 9:
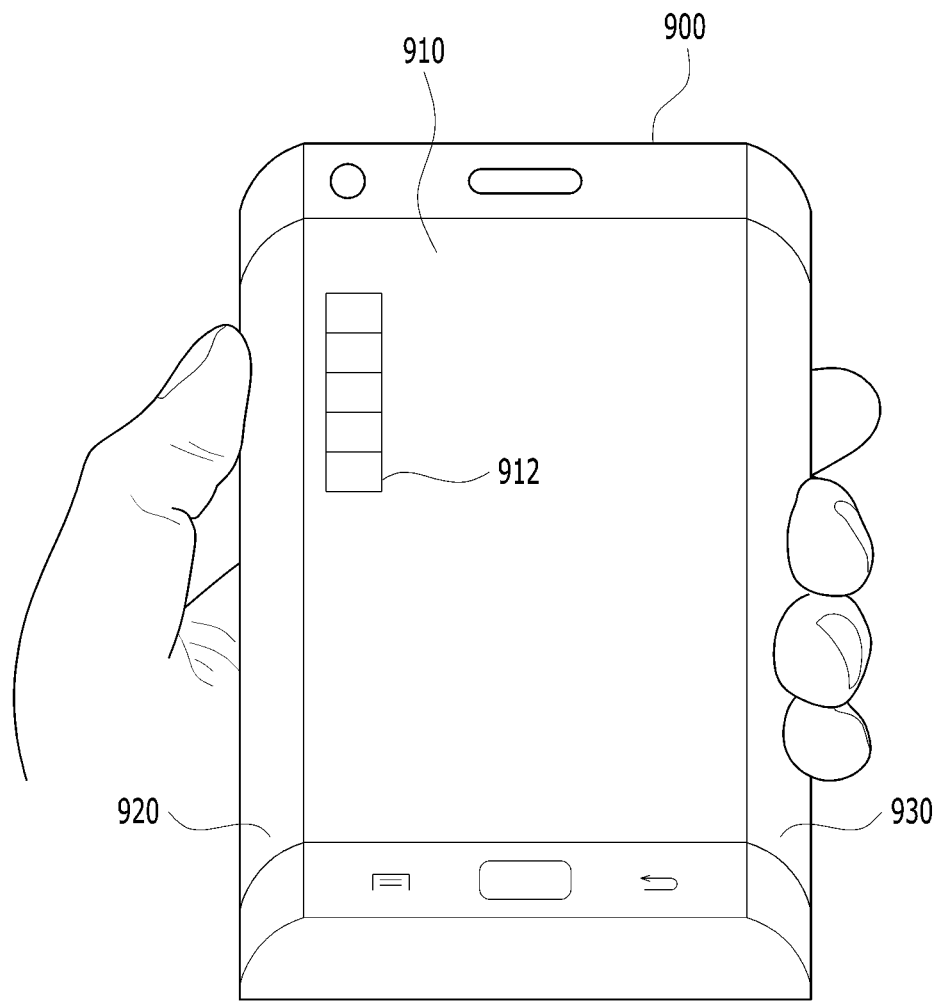
FIG. 9 is a diagram for a different example of a first process making an attempt at lock of a mobile device using a side surface of the mobile terminal according to one embodiment of the present invention.

FIG. 9 is a diagram for a different example of a first process making an attempt at lock of a mobile device using a side surface of the mobile terminal according to one embodiment of the present invention. FIG. 9 can be complementally interpreted with reference to content mentioned earlier in FIG. 8.

In particular, as shown in FIG. 9, a mobile terminal 900 according to one embodiment of the present invention is configured to include both a first touch screen 920 and a second touch screen 910. Yet, unlike FIG. 8, in FIG. 9, if an initial user touch is recognized on the first touch screen (situating at a side surface), 5 blocks 912 are configured to be displayed on the second touch screen 910 only. Of course, the blocks 912 can be displayed on the first touch screen 920 as well.

When the displayed blocks 812/912 are designed to be differently displayed according to movement of a touch moving after the initial user touch, the displayed blocks play a role of an indicator indicating a distance and a direction touched by the user in real time.

Hence, unlike FIG. 8, in FIG. 9, a reason of displaying the blocks 912 in a manner of reducing the number of the blocks 912 is as follows. In case of continuously touching a side surface of the mobile terminal while a user is holding the mobile terminal 900, a distance capable of being continuously touched by a single finger of the user is very limitative.

If a user inputs a touch pattern on the too many or too less number/size of blocks, possibility of error increases. A solution for eliminating the aforementioned problem shall be described in the following with reference to FIG. 10.

FIG. 10 is a diagram for an example of a database usable for implementing embodiment of FIG. 9.

In case of continuously touching a side surface of a mobile terminal while a user maintains a state of holding the mobile terminal, it is necessary to consider a difference between individuals. For instance, it is required to sensitively sense a touch drag of one user, whereas it is required to insensitively sense a touch drag of another user.

More specifically, for instance, in order to lock a mobile terminal using a side surface, a size (a) of displayed blocks is increased and the number (b) of the displayed blocks is decreased in proportion to a size (A) of an initially touched finger floor.

On the contrary, in order to lock the mobile terminal using the side surface, a size (c) of displayed blocks is decreased and the number (d) of the displayed blocks is increased in proportion to a length (B) of an initially touched finger. A method of calculating the length of the finger has two solutions.

First of all, it is able to simply estimate a B value in proportion to the size (A) value.

Secondly, it is able to calculate the length of the finger in a manner of capturing a picture of the finger using a camera of the mobile terminal.

As shown in the bottom part of a Table shown in FIG. 10, adjusting a size (e) and the number (f) of the displayed blocks by considering both the A value and the B value also belongs to the scope of right of the present invention.

Figure 11:
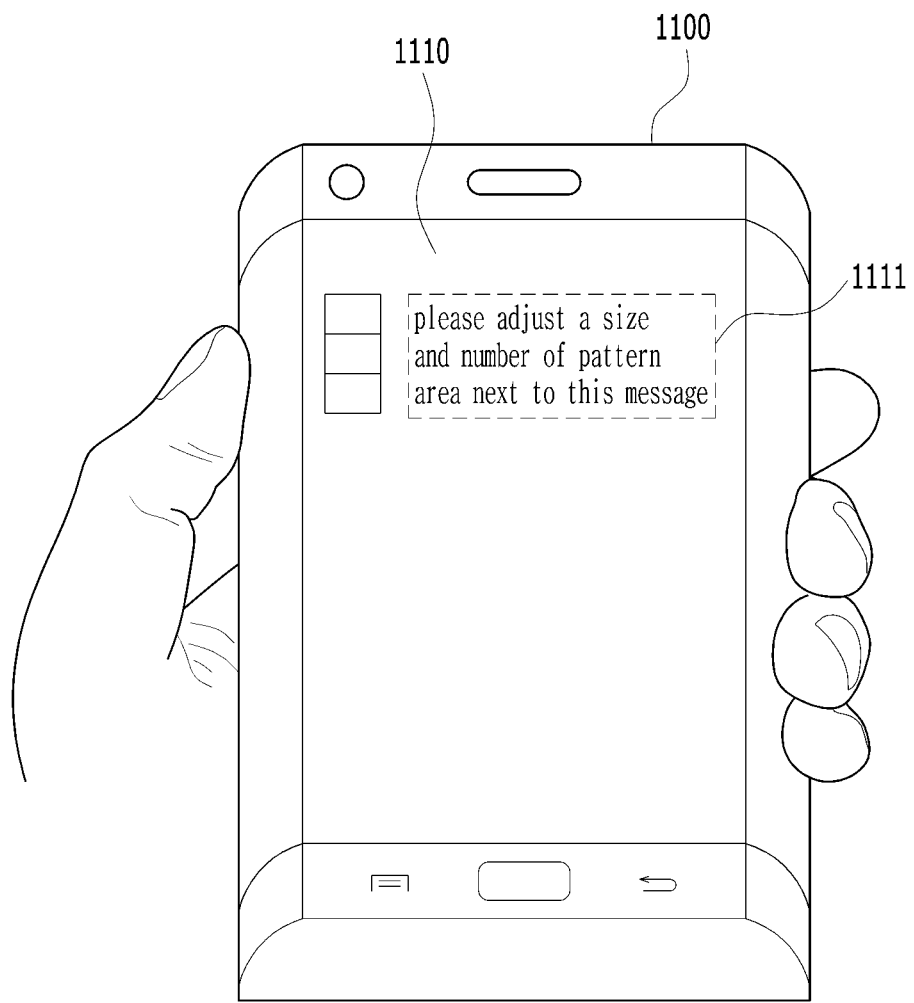
FIG. 11 is a diagram for a further different example of a first process making an attempt at lock of a mobile device using a side surface of the mobile terminal according to one embodiment of the present invention.

FIG. 11 is a diagram for a further different example of a first process making an attempt at lock of a mobile device using a side surface of the mobile terminal according to one embodiment of the present invention.

A solution automatically calculating a size and the number of blocks to be displayed is proposed in the foregoing description with reference to FIG. 8 to FIG. 10. On the contrary, a method of considering user convenience is proposed in FIG. 11 in the following.

A mobile terminal 1100 according to one embodiment of the present invention displays a guide message 111 on a second touch screen 1110 when a command starting a touch pattern input related to lock of the mobile terminal is received.

The guide message 1111 displays an option capable of selecting at least one of a size and the number of blocks related to lock/unlock of the mobile terminal. Hence, a user can determine a size and the number of blocks optimized for the user in consideration of a personal situation of the user.

In FIG. 8 to FIG. 11, a process of determining at least one of a size and the number of blocks related to lock/unlock of the mobile terminal using a side surface has been explained in detail.

In the following, a process of changing determined blocks according to a touch pattern input of a user is explained with reference to FIG. 12 to FIG. 15.

Figure 12:
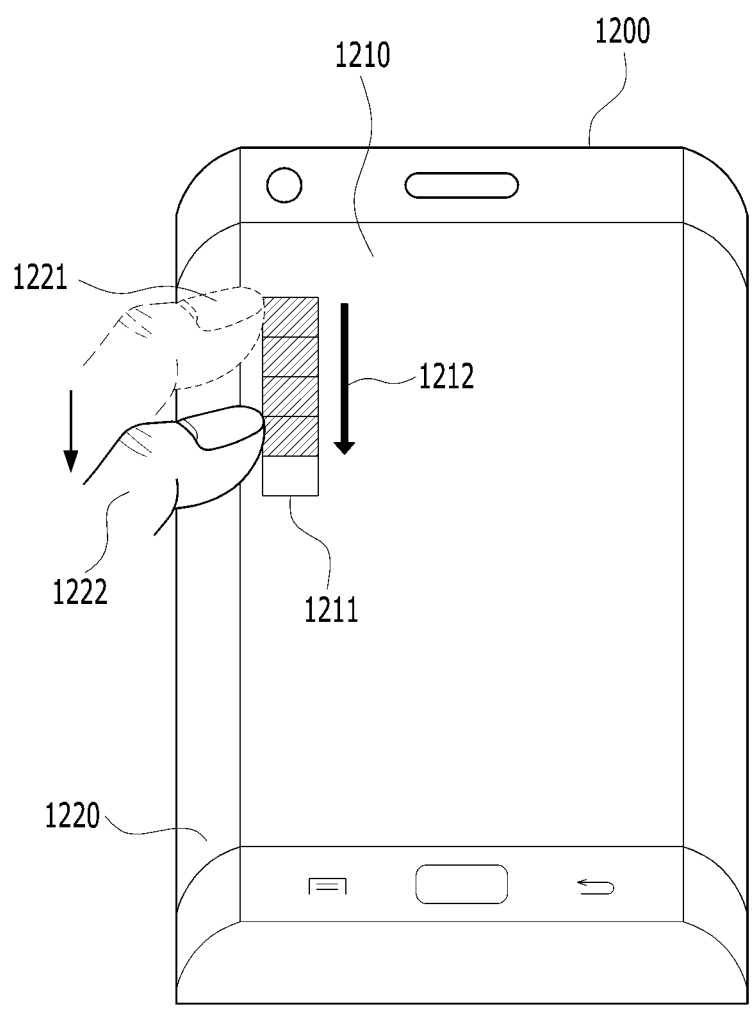
FIG. 12 is a diagram for an example of a second process making an attempt at lock of a mobile device using a side surface of the mobile terminal according to one embodiment of the present invention.

FIG. 12 is a diagram for an example of a second process making an attempt at lock of a mobile device using a side surface of the mobile terminal according to one embodiment of the present invention.

Assume that a touch of a user is initially detected on a first position 1221 of a first touch screen 1220 of a mobile terminal according to one embodiment of the present invention. In this case, a second touch screen 1210 displays blocks 1211 starting from a point corresponding (adjacent) to the first position 1221.

Moreover, if a first touch input of the user is seamlessly continuous from the first position 1221 to a second position 1222 in a manner that the user seamlessly drags the touch, 4 blocks are highlighted only among a total of 5 blocks 1211. In this case, 4 blocks are determined in consideration of a distance between the first position 1221 and the second position 1222. In particular, if a shorter distance is dragged, blocks less than 4 blocks may be displayed. If a longer distance is dragged, blocks greater than 4 blocks may be displayed.

In order to display a direction to which the user made an attempt at the first touch input, the second touch screen 1210 displays a graphic image of an indicator 1212 indicating the direction.

Figure 13:
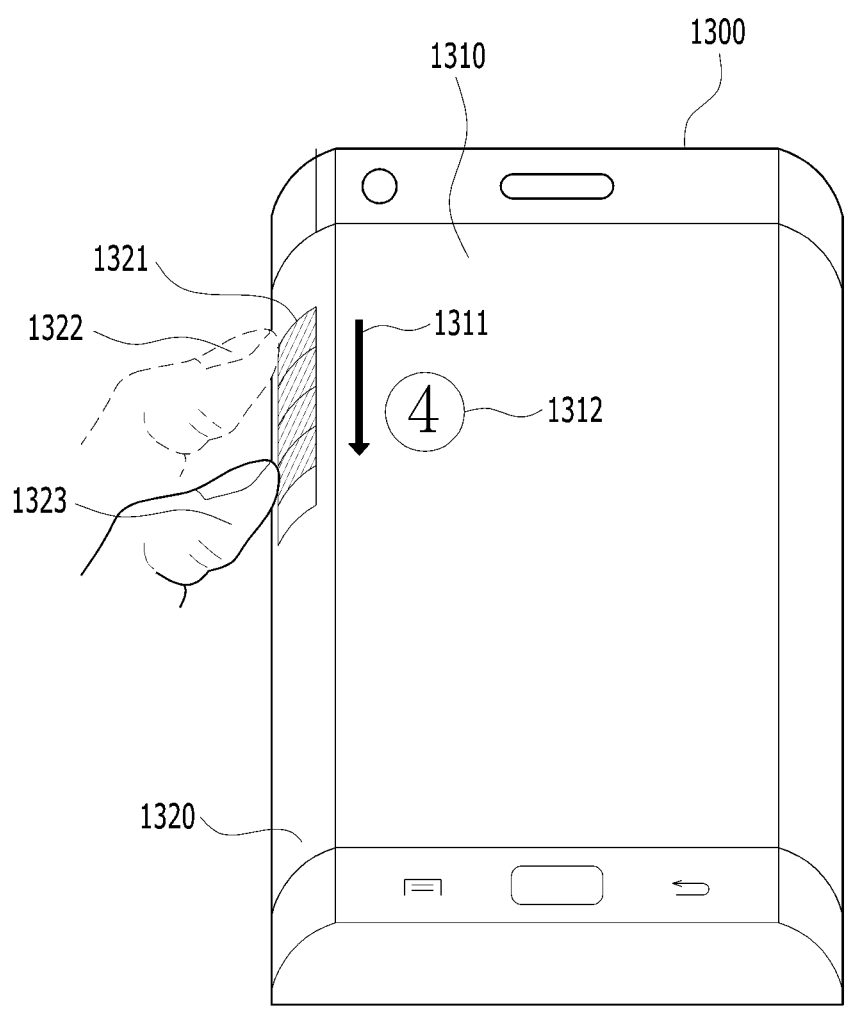
FIG. 13 is a diagram for a different example of a second process making an attempt at lock of a mobile device using a side surface of the mobile terminal according to one embodiment of the present invention.

FIG. 13 is a diagram for a different example of a second process making an attempt at lock of a mobile device using a side surface of the mobile terminal according to one embodiment of the present invention.

Compared to FIG. 12, an area on which blocks are displayed is different from that of FIG. 12. It may raise user convenience using an additional graphic image.

Assume that a touch of a user is initially detected on a first position 1321 of a first touch screen 1320 of a mobile terminal 1300 according to one embodiment of the present invention. Moreover, if a first touch input of the user is seamlessly continuous from a first position 1322 to a second position 1323 in a manner that the user seamlessly drags the touch, 4 blocks are highlighted only among a total of 5 blocks 1321. In this case, the blocks 1321 is used as a concept identical to that of the blocks 1211 mentioned earlier in FIG. 12. Yet, unlike FIG. 12, there is a difference in that the blocks are displayed on the first touch screen 1320.

Moreover, in order to display a direction to which the user made an attempt at the first touch input, a second touch screen 1310 displays a graphic image of an indicator 1311 indicating the direction.

And, unlike FIG. 12, additional information 1312 configured to intuitively display a distance (the number of blocks) of a first touch input dragged by a user to lock a mobile terminal is displayed on the second touch screen 1310 in a number form in FIG. 13. Hence, it is not necessary for the user to directly check a side surface (first touch screen).

Figure 14:
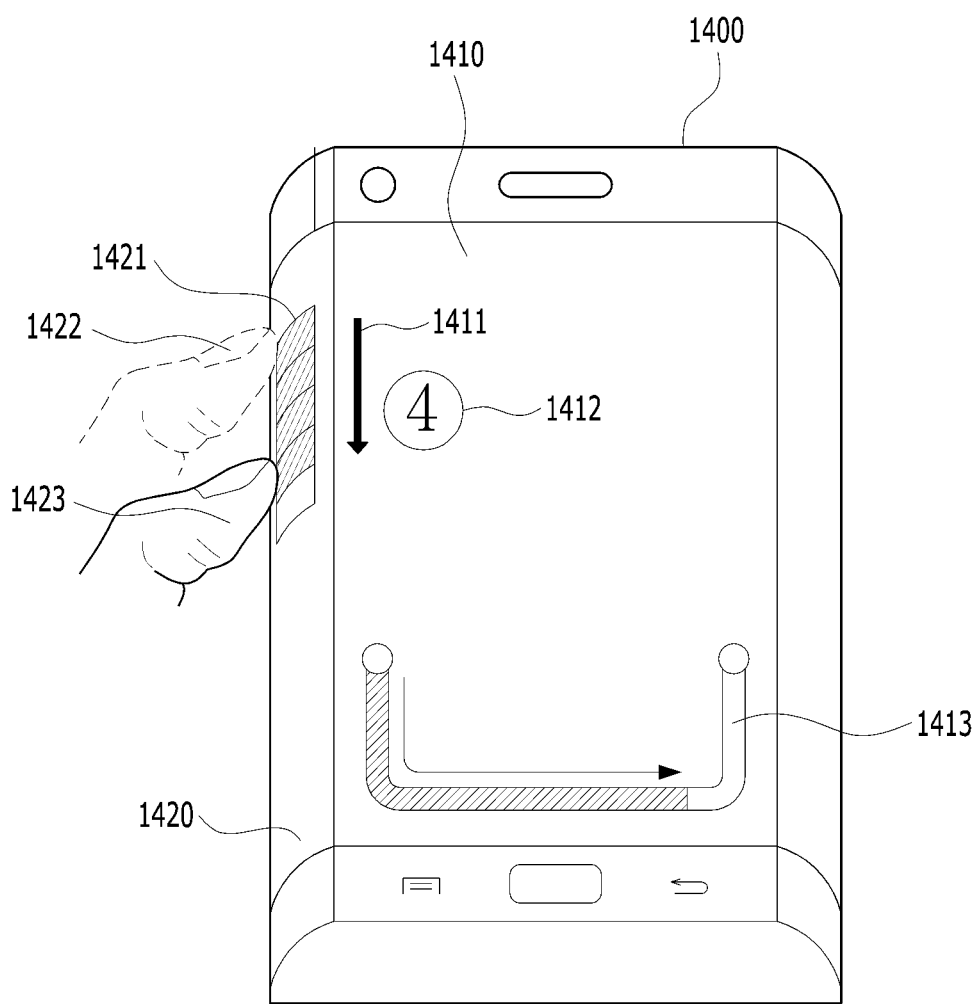
FIG. 14 is a diagram for a further different example of a second process making an attempt at lock of a mobile device using a side surface of the mobile terminal according to one embodiment of the present invention.

FIG. 14 is a diagram for a further different example of a second process making an attempt at lock of a mobile device using a side surface of the mobile terminal according to one embodiment of the present invention.

Unlike FIG. 13, in FIG. 14, there is a difference in that a user displays a first touch input of a user with a graphic.

Assume that a touch of a user is initially detected on a first position 1422 of a first touch screen 1420 of a mobile terminal 1400 according to one embodiment of the present invention. Moreover, if a first touch input of the user is seamlessly continuous from a first position 1422 to a second position 1423 in a manner that the user seamlessly drags the touch, 4 blocks are highlighted only among a total of 5 blocks 1421.

Moreover, in order to display a direction to which the user made an attempt at the first touch input, a second touch screen 1410 displays a graphic image of an indicator 1411 indicating the direction. And, additional information 1412 configured to intuitively display a distance (the number of blocks) of a first touch input dragged by a user to lock a mobile terminal is displayed on the second touch screen 1410 in a number form.

Unlike FIG. 13, in FIG. 14, not only the additional information 1412 of the number form but also additional information 1413 of a graphic form is additionally displayed.

For instance, the additional information 1413 of the graphic form is changed according to a direction and a distance of the first touch input of the user. More specifically, for instance, when a graphic image of an empty tube form is displayed, if the first touch input of the user starts in down direction, a graphic image of gradually inducting the water into the empty tube is displayed. If the first touch input ends, the graphic image of inducting the water into the tube also stops.

Figure 15:
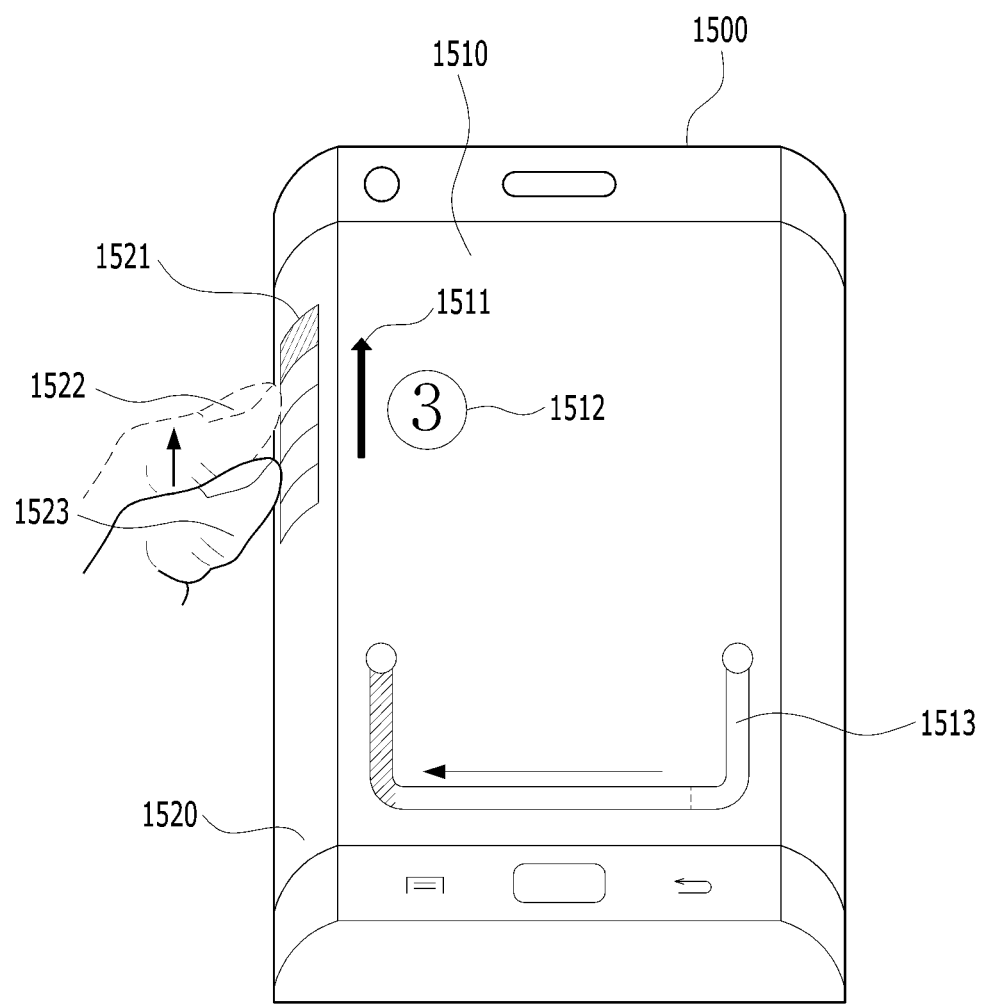
FIG. 15 is a diagram for a further different example of a second process making an attempt at lock of a mobile device using a side surface of the mobile terminal according to one embodiment of the present invention.

FIG. 15 is a diagram for a further different example of a second process making an attempt at lock of a mobile device using a side surface of the mobile terminal according to one embodiment of the present invention.

FIG. 15 shows a case that a second touch input is received on the premise of FIG. 14. The second touch input is performed in a direction opposite to a direction of a first touch input. Basically, a touch pattern to lock a mobile terminal is explained based on two directions (up/down). Yet, configuring a pattern with three or more directions according to the necessity of those skilled in the art also belongs to the scope of right of the present invention.

Assume that there is a continuous second touch input inputted to an up direction after a first touch input inputted to a down direction is completed. Of course, a discontinuous first touch input and a discontinuous second touch input also belong to the scope of right of the present invention.

If a touch to a different direction is detected on a point 1523 where the first touch input ends, the touch is considered as a second touch input. The second touch input is continuously dragged from a first point 1523 to a second point 1522. In this case, one block is displayed only among blocks 1521 displayed on a first touch screen 1520. This does not mean that a distance corresponding to one block is dragged. Instead, it displays a result that a user has dragged a distance corresponding to 4 blocks to down direction in FIG. 14 and then the user has dragged a distance corresponding to 3 blocks to up direction in FIG. 15.

Hence, for more precise information, a second touch screen 1510 displays an indicator 1511 indicating a direction and an indicator indicating the extent of dragging of the second touch input of a number form 1512 and a graphic image form 1513.

The graphic image 1513 is additionally explained. Unlike the graphic image 1413 shown in FIG. 14, the graphic image 1513 is designed to display a shape that the water is reduced to an opposite direction.

In summary, the number of blocks (or units) respectively corresponding to distance information of the first touch input and that of the second touch input used for registering a lock pattern is displayed on a first area 1512 of the second touch screen. Explanation on the first touch input and the second touch input is identically applied to both a third touch input and a fourth touch input, which are received to unlock a mobile terminal.

Moreover, as shown in FIG. 15, a progressive bar depending on distance information and direction information of each of a first touch input and a second touch input, which are used for registering a lock pattern, is displayed on a second area 1513 of the second touch screen. Explanation on the first touch input and the second touch input is identically applied to both a third touch input and a fourth touch input, which are received to unlock a mobile terminal.

Figure 16:
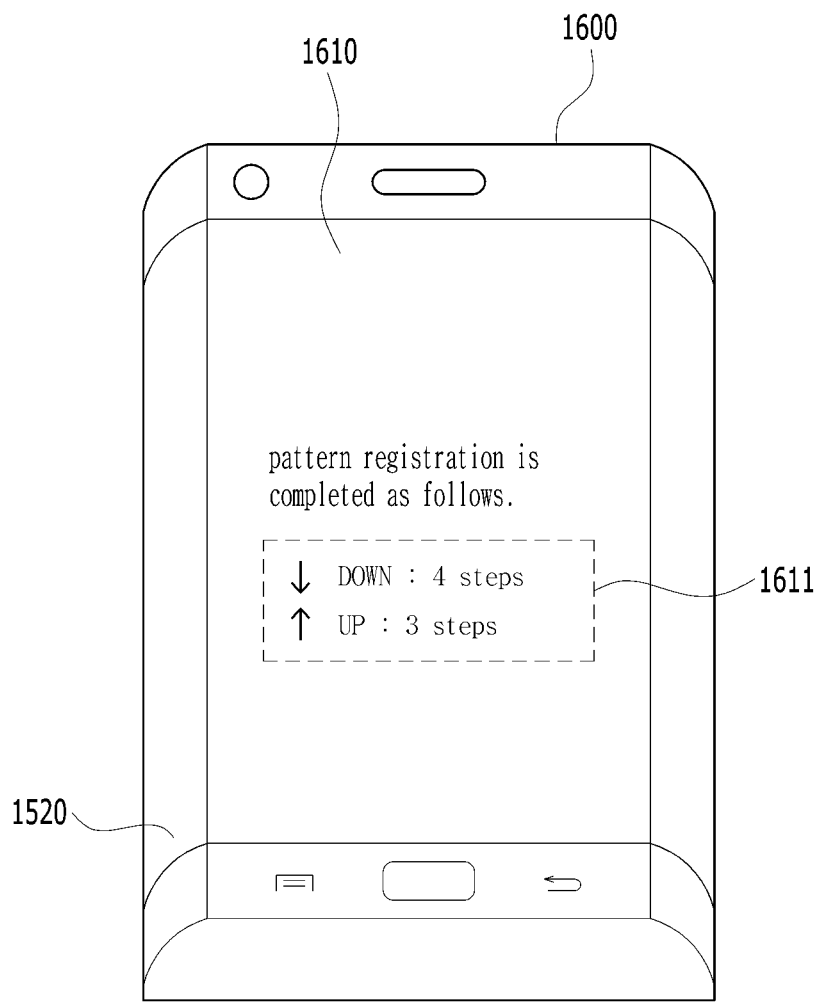
FIG. 16 is a diagram for an example that lock of a mobile terminal is completed using a side surface of the mobile terminal according to one embodiment of the present invention.

FIG. 16 is a diagram for an example that lock of a mobile terminal is completed using a side surface of the mobile terminal according to one embodiment of the present invention.

If the process shown in FIG. 12 to FIG. 15 is completed, as shown in FIG. 16, a graphic image indicating that a pattern registration for lock/unlock is completed is displayed. Meanwhile, a first touch input (e.g., a continuous down direction touch drag) and a second touch input (e.g., a continuous up direction touch drag), which are recognized according to the process shown in FIG. 12 to FIG. 15, are stored in a memory of a mobile terminal as a unlock pattern.

In particular, a mobile terminal 1600 according to one embodiment of the present invention displays additional information 1611 indicating a direction and the extent (length or the number of blocks) of a pattern registered by a user on a second touch screen 1610.

Hence, when the user makes an attempt at unlock in the future, the mobile terminal is unlocked and various functions are executed only when the user inputs or touches the displayed additional information 1611 again.

A process of inputting a touch pattern to unlock a mobile terminal has been explained with reference to FIG. 8 to FIG. 16 in the foregoing description. In FIG. 17 to FIG. 26, a process of making an attempt at unlock of the mobile terminal is explained in detail.

Figure 17:
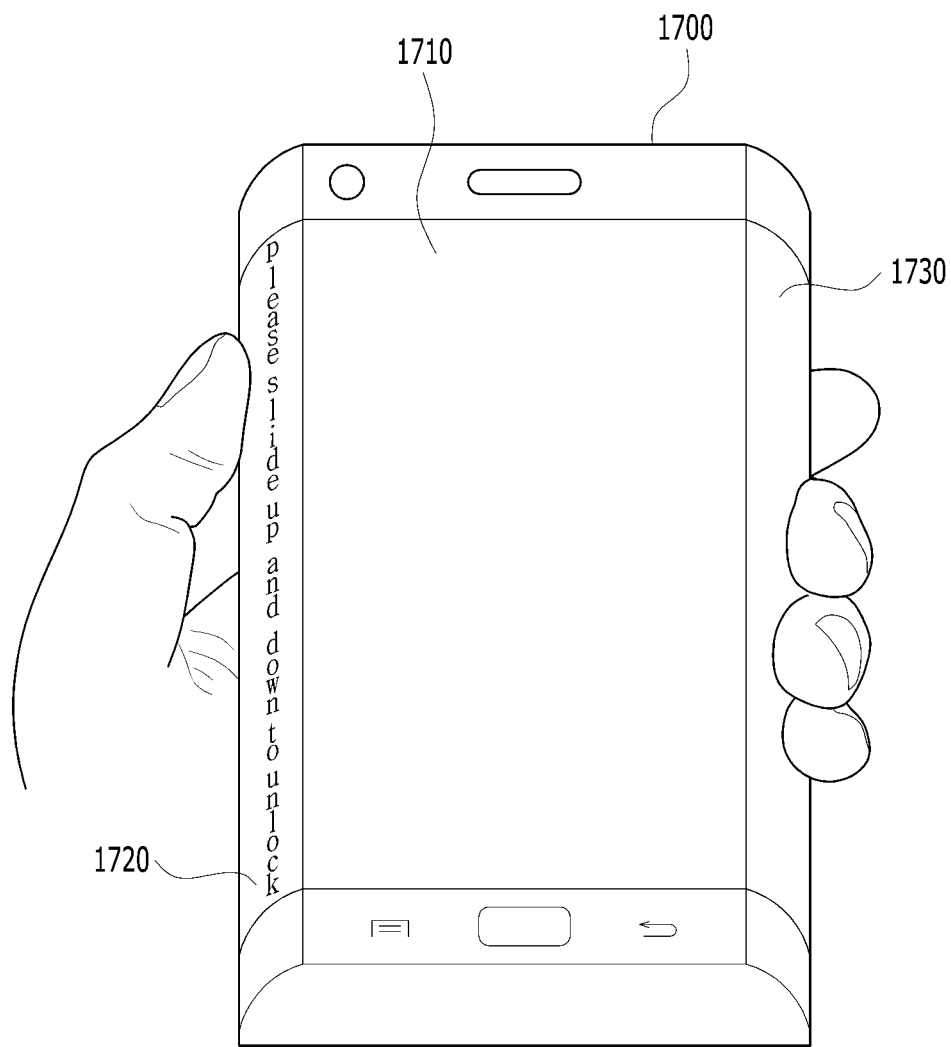
FIG. 17 is a diagram for an example that a guide message for unlocking a mobile terminal is outputted using a side surface of the mobile terminal according to one embodiment of the present invention.

FIG. 17 is a diagram for an example that a guide message for unlocking a mobile terminal is outputted using a side surface of the mobile terminal according to one embodiment of the present invention.

As mentioned in the foregoing description, assume that lock is set to a side surface (or a first touch screen). Hence, no message is displayed on a second touch screen 1710 including a main display and the second touch screen maintains a state that a touch of a user is not recognized.

If a mobile terminal 1700 according to one embodiment of the present invention detects a touch of a user on a side surface or a first touch screen 1720, a guide message such as "slide up and down to unlock" is displayed. Of course, changing a part of content of the guide message also belongs to the scope of right of the present invention.

Figure 18:
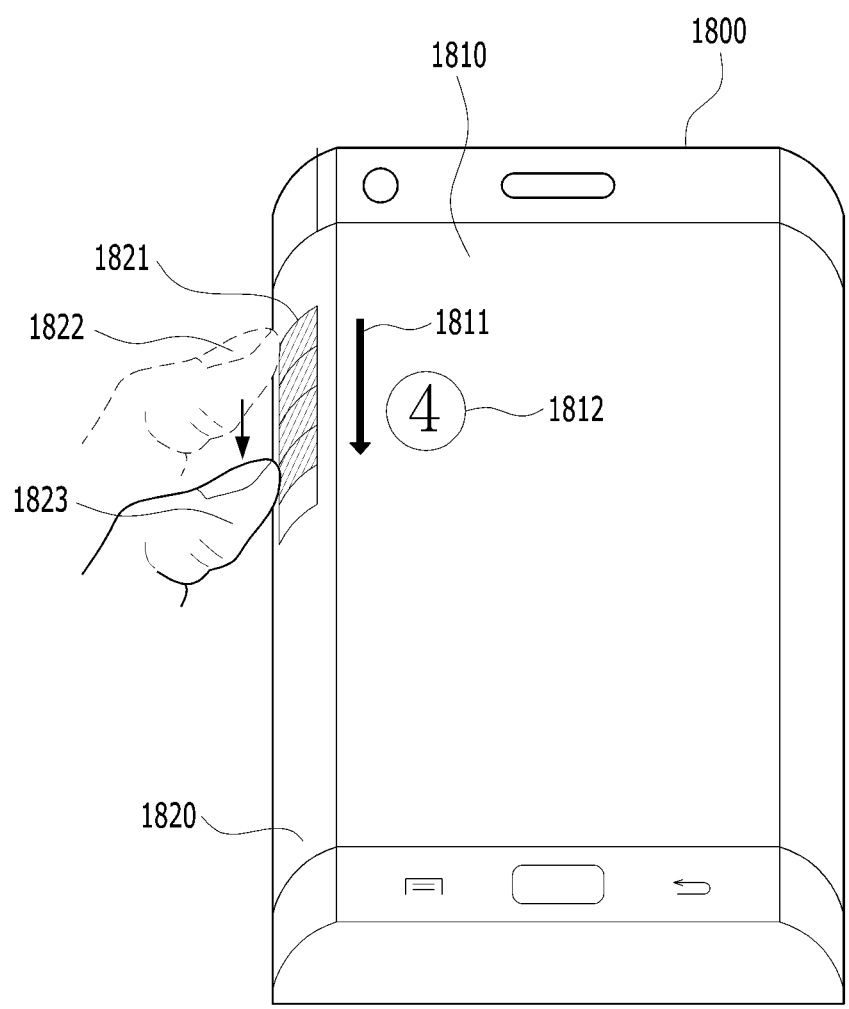
FIG. 18 is a diagram for an example of a first process making an attempt at unlock of a mobile device using a side surface of the mobile terminal according to one embodiment of the present invention.

FIG. 18 is a diagram for an example of a first process making an attempt at unlock of a mobile device using a side surface of the mobile terminal according to one embodiment of the present invention.

As repeatedly mentioned in the foregoing description, as shown in FIG. 18, a mobile terminal 1800 according to one embodiment of the present invention includes both a first touch screen 1820 including a sub display and a second touch screen 1810 including a main display. Having checked the guide message shown in FIG. 17, a user makes an attempt at unlock of the mobile terminal as shown in FIG. 18.

A third touch input starting on a second position 1822 of a first touch screen 1820 is recognized by a touch recognition sensor of the mobile terminal 1800. The second position may be identical or different to/from the aforementioned first position (the point firstly recognized in the process of inputting a pattern to lock the mobile terminal). In particular, a user does not need to memorize a firstly registered position.

A touch is dragged in one direction from the second position 1822 to a different point 1823. The touch is called a third touch input.

In this case, similar to the process of inputting a pattern to lock the mobile terminal, a plurality of blocks 1821 are displayed on the first touch screen 1820 and 4 blocks are highlighted only in proportion to a distance dragged by a user.

For a case that the user keeps an eye on a second screen 1810 without monitoring the first touch screen 1820, an indicator 1811 indicating a direction of a moved drag and an indicator 1812 indicating the number of highlighted blocks are displayed on the second touch screen 1810.

After touching the first pattern (third touch input), which is remembered by the user, used for unlocking the mobile terminal, the user makes an attempt at a touch drag (fourth touch input) of a next direction. In relation to this, it shall be explained with reference to FIG. 19 in the following.

Figure 19:
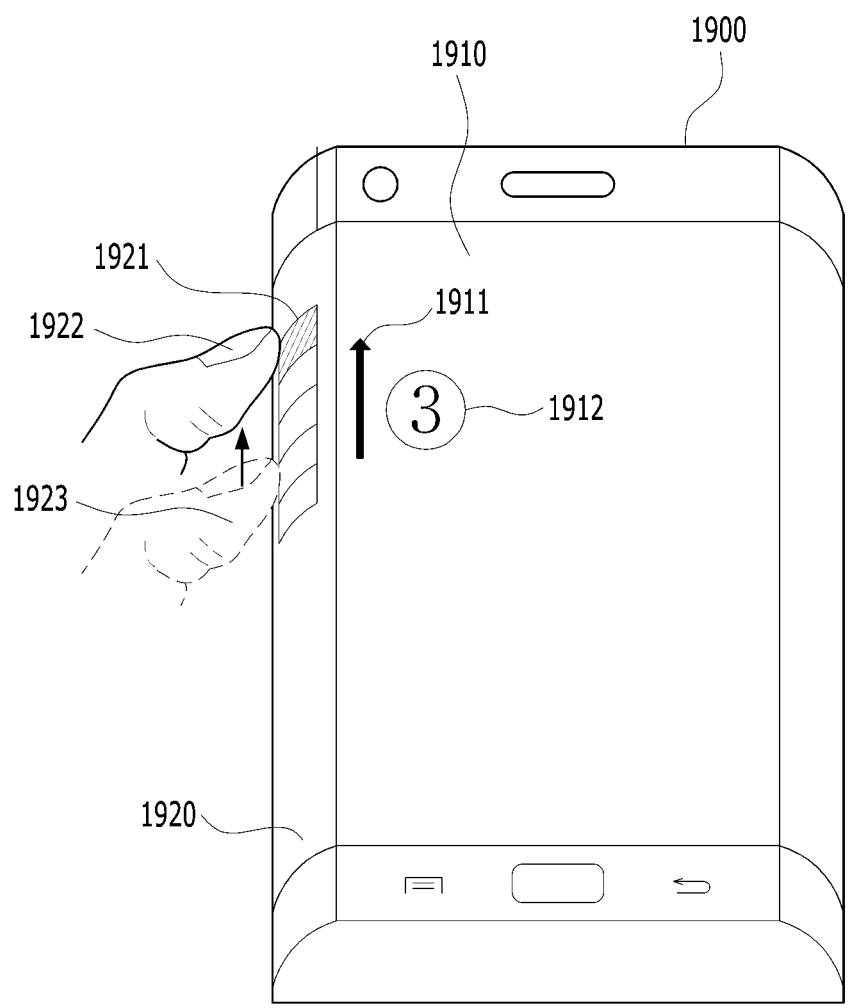
FIG. 19 is a diagram for an example of a second process making an attempt at unlock of a mobile device using a side surface of the mobile terminal according to one embodiment of the present invention.

FIG. 19 is a diagram for an example of a second process making an attempt at unlock of a mobile device using a side surface of the mobile terminal according to one embodiment of the present invention.

A fourth touch input starting on a prescribed point 1923 of a first touch screen 1920 is recognized by a touch recognition sensor of the mobile terminal 1900. For instance, the prescribed point means a point where the aforementioned direction of the third touch input is changed.

Hence, the third touch input and the fourth touch input may correspond to a discontinuous touch input. Yet, continuously moving the third touch input and the fourth touch input like one touch drag also belongs to the scope of right of the present invention.

A touch is dragged from the prescribed point 1923 to a different point 1922 in one direction. This is called a fourth touch input.

In this case, similar to the process of inputting a pattern to lock a mobile terminal, a plurality of blocks 1921 are displayed on the first touch screen 1920. Blocks are highlighted in proportion to a distance dragged by a user. Or, the number of blocks deducted from a plurality of the blocks in proportion to the distance is highlighted. In particular, if 4 blocks are highlighted in down direction by the third touch input and then the touch is moved up as much as 3 blocks by the fourth touch input (4−3=1), 1 block is highlighted only. No matter what scheme is applied, it belongs to the scope of right of the present invention.

Moreover, as mentioned earlier in FIG. 18, for a case that a user keeps an eye on a second screen 1910 without monitoring the first touch screen 1920, an indicator 1911 indicating a direction of a moved drag and an indicator 1912 indicating the number of blocks, which is proportional to a dragged distance, are displayed on the second touch screen 1910.

Hence, a unlock pattern stored in a memory in advance is compared with the recognized third touch input and the fourth touch input. By doing so, a main display or a sub display is unlocked according to a result of the comparison. The comparing process may adopt a scheme of comparing the number of blocks with each other without directly comparing a drag distance. In case of using the scheme, it may improve data processing speed.

Yet, if a point initially selected by a user to unlock a display is very close to an end point of the first touch screen or a touch drag is contacted with the end point of the first touch screen in a state that the touch drag is not moved as much as the user wants, it is necessary to have a solution to solve the aforementioned case. In relation to this, it shall be described with reference to FIG. 20 to FIG. 22 in the following.

Figure 20:
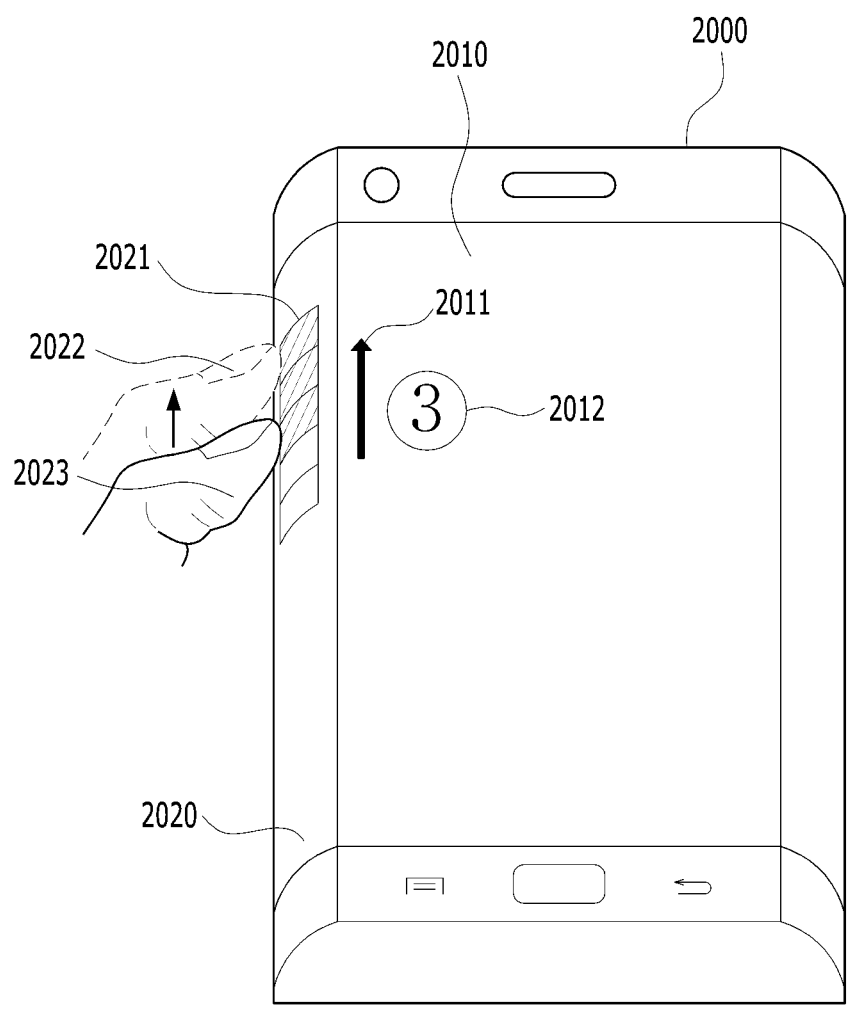
FIGS. 20 to 22 are diagrams for a different example of a second process making an attempt at unlock of a mobile device using a side surface of the mobile terminal according to one embodiment of the present invention.
Figure 21:
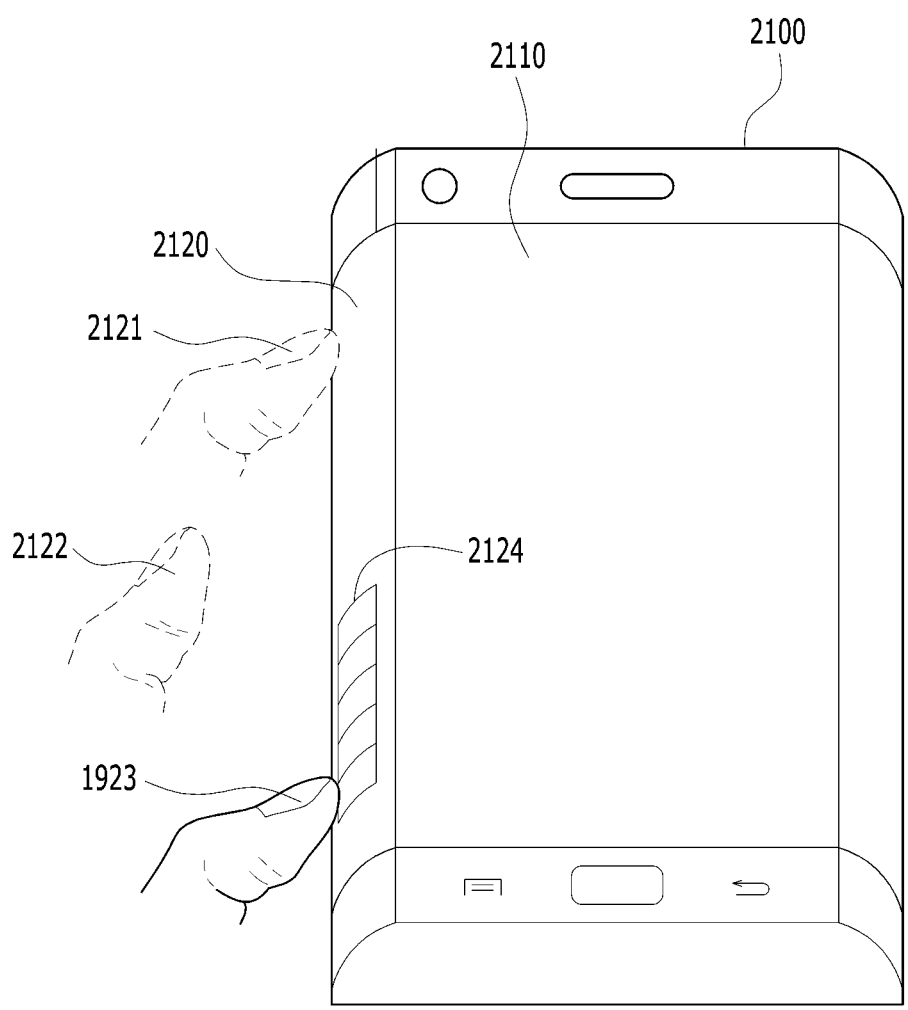
Figure 22:
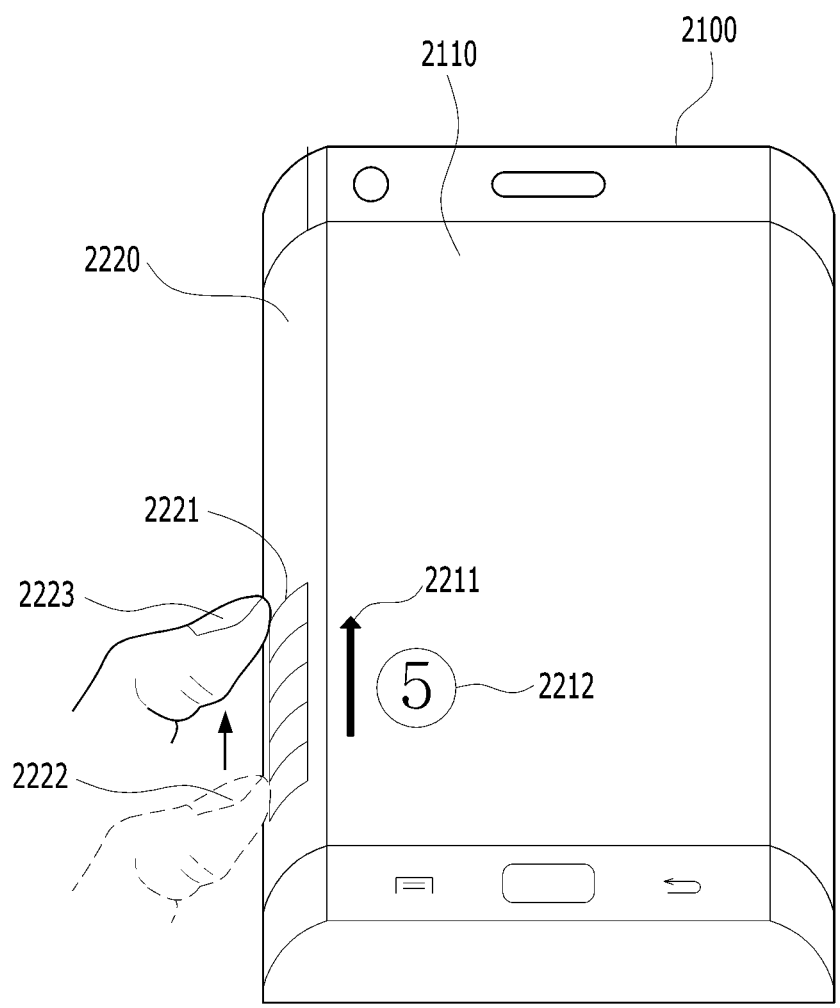

FIGS. 20 to 22 are diagrams for a different example of a second process making an attempt at unlock of a mobile device using a side surface of the mobile terminal according to one embodiment of the present invention.

As shown in FIG. 20, a mobile terminal 2000 according to one embodiment of the present invention displays a plurality of blocks on a first touch screen and displays an indicator 2011 proportional to a distance of which a touch drag is moved and a number 2012.

For instance, if a touch drag is contacted with an end point 2022 of the first touch screen 2020 while the touch drag is moving up from a point 2023 initially touched by a user, the user is unable to move the touch drag up anymore. In particular, although the number of blocks intended to drag by the user was 5, the user was able to drag a distance corresponding to 3 blocks only due to space shortage of the touch screen.

In this case, if the user starts a touch again to unlock a display from the beginning, it would be very damaging in terms of time. Moreover, if unlock should be started in the midst of a touch screen instead of the top of the touch screen, it would be very inconvenient function. A solution to solve the aforementioned problem shall be described with reference to FIG. 21 and FIG. 22 in the following.

As shown in FIG. 21, if the aforementioned initial third touch input (touch drag to unlock a display) is recognized on an end point 2121 of the first touch screen, a user releases 2122 the touch from the first touch screen and touches a random point 2123 again.

In this case, a mobile terminal 2100 stores the number of blocks recognized in FIG. 20 in a memory. And, a position of a plurality of blocks 2124 is changed to a new position close to the newly touched random point 2123.

Lastly, as shown in FIG. 22, if a user continuously touches a first touch screen from a newly touched random point 2222 to a final point 2223, blocks 2221 on the first touch screen 2220 are all highlighted. A direction 2211 and the number of highlighted blocks 2212 are displayed on a second touch screen 2210.

Although a distance corresponding to 2 blocks is dragged only in FIG. 22, it is designed to add up a distance corresponding to 3 blocks stored in a memory in FIG. 20. If an initial touch touched in FIG. 20 is considered as a third touch input, an initial touch touched in FIG. 22 can be considered as a third-a touch input.

Meanwhile, if an initial touch input touched in one direction to unlock a display corresponds to a third touch input, a touch input touched in a direction opposite to the direction of the third touch input can be called a fourth touch input.

Similarly, if the fourth touch input is recognized on an end point of the first touch screen 2220, it is designed to add up distance information of a newly touched fourth-a touch input and distance information of a previously touched fourth touch input. And, designing an indicator proportion to the add-up distance to be displayed on a second touch screen 2210 also belongs to the scope of right of the present invention.

Figure 23:
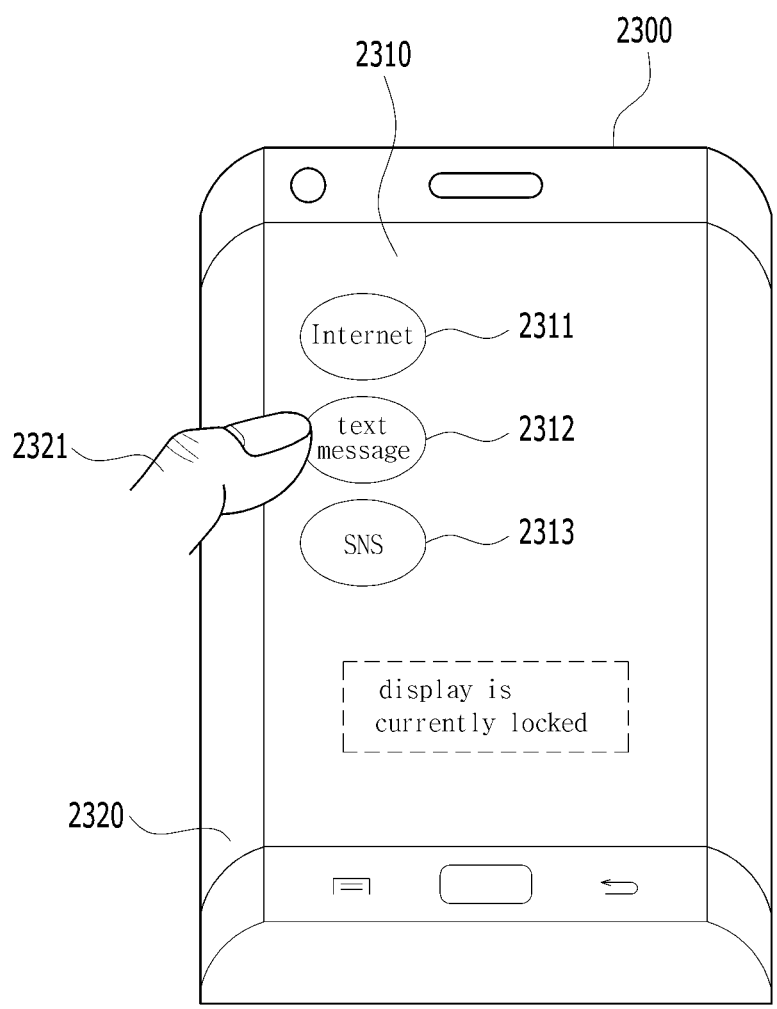
FIG. 23 is a diagram for a different example of a first process making an attempt at unlock of a mobile device using a side surface of the mobile terminal according to one embodiment of the present invention.

FIG. 23 is a diagram for a different example of a first process making an attempt at unlock of a mobile device using a side surface of the mobile terminal according to one embodiment of the present invention. The aforementioned FIG. 17 to FIG. 22 are similarly applied to the process.

Yet, a mobile terminal 2300 shown in FIG. 23 is configured to display several basic applications 2311/2312/2313 on a second touch screen 2310 before lock is cancelled. Of course, since a display is currently in a lock state, an application is not executed although the second touch screen 2310 is directly touched.

If unlock is tried according to the aforementioned FIG. 17 to FIG. 22 and pattern authentication succeeds, lock of a display is cancelled and a basic screen is displayed. Yet, according to one embodiment of the present invention, after a user initially selects a prescribed point of a first touch screen 2320, a specific application is executed at the same time as unlock or in sequence according to whether the user inputs a pattern to unlock a display.

For instance, as shown in FIG. 23, assume that an initially recognized touch point 2321 touched by a user is the closest to a position of a text message application 2312. Moreover, as mentioned earlier in FIG. 17 to FIG. 22, assume that at least two or more touch pattern inputs (e.g., one touch pattern input in down direction and one touch pattern input in down direction) are inputted on the first touch screen 2320.

Figure 24:
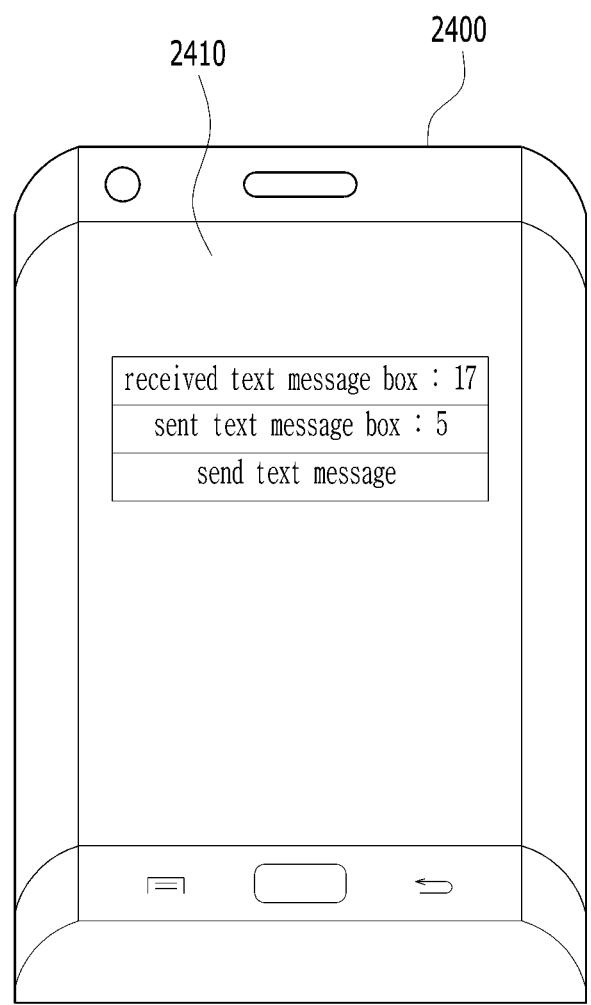
FIG. 24 is a diagram for a graphic image outputted by a mobile terminal which is unlocked based on FIG. 23.

In this case, as shown in FIG. 24, a mobile terminal is configured to output a screen in which a text message application is executed on a second touch screen 2410 at the same time as unlock.

Hence, a user can freely select a random application preferred to execute at the same time as unlock and can improve data processing speed of an application.

In summary, assume that an application adjacent to a random position of the first touch screen 2320 is displayed on a main display of the second touch screen 2310. The random position indicates a point of the first touch screen initially touched by a user to unlock a display.

If a touch pattern to unlock a display is correctly inputted, a command for executing the application is generated at the same time of executing unlock or after unlock is executed. And, the application is executed based on the generated command.

Figure 25:
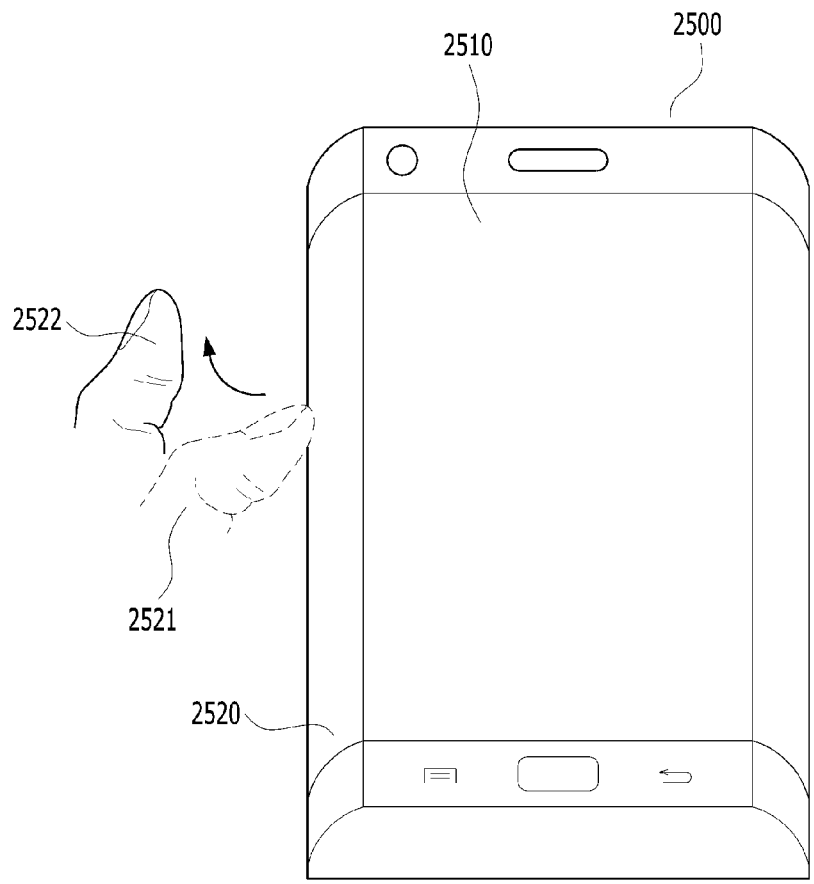
FIG. 25 is a diagram for an example of a third process making an attempt at unlock of a mobile device using a side surface of the mobile terminal according to one embodiment of the present invention.
Figure 25:
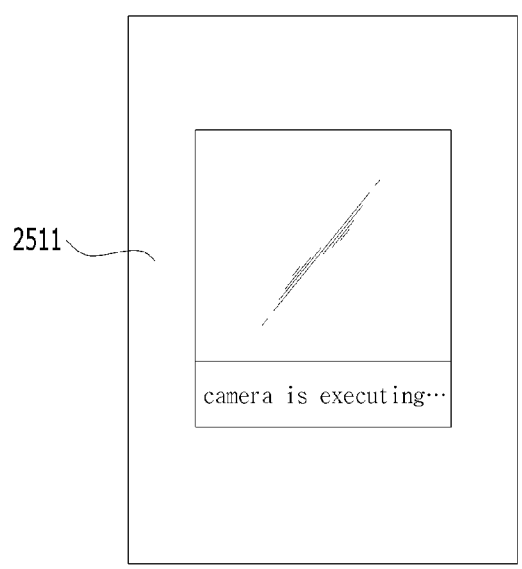
Figure 26:
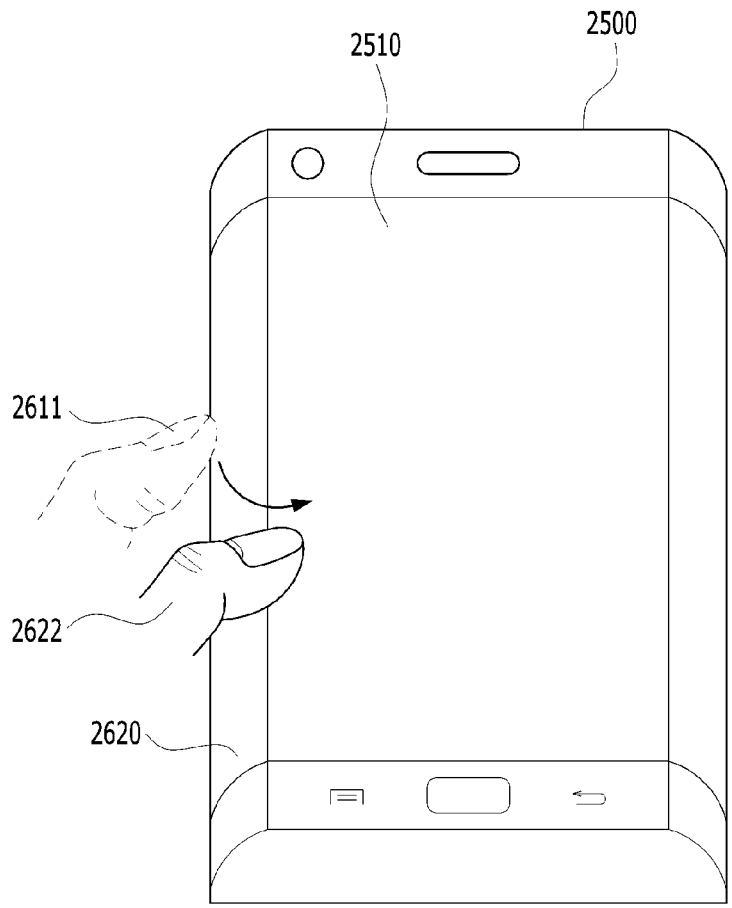
FIG. 26 is a diagram for a different example of a third process making an attempt at unlock of a mobile device using a side surface of the mobile terminal according to one embodiment of the present invention.
Figure 26:
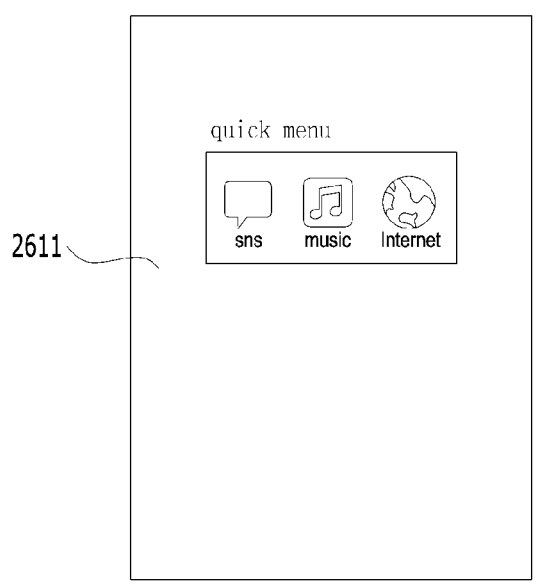

FIG. 25 and FIG. 26 described in the following can be implemented in a manner of being independent of the embodiments of the previously explained drawings or being combined with the embodiments of the previously explained drawings.

FIG. 25 is a diagram for an example of a third process making an attempt at unlock of a mobile device using a side surface of the mobile terminal according to one embodiment of the present invention.

According to the aforementioned drawings, a direction of a touch pattern to unlock a display is limited to two types (up/down) only. Yet, in FIG. 25 and FIG. 26, the direction of the touch pattern is extended to a left direction and a right direction.

As shown in FIG. 25 (*a*), after a pattern input for unlock in up/down direction is successfully inputted on a side surface on the premise of explanation on the aforementioned drawings, a position of a last touch drag on a first touch screen 2520 of a mobile terminal 2500 is changed from a first position 2521 to a second position 2522. In particular, FIG. 25 (*a*) shows that a touch is performed in an outside direction on the basis of a user.

In this case, as shown in FIG. 25 (*b*), a second screen is unlocked and executes a camera function at the same time (2510→2511). Of course, although FIG. 25 shows the camera function as an example, changing the camera function to a specific function preferred by a user also belongs to the scope of right of the present invention.

FIG. 26 is a diagram for a different example of a third process making an attempt at unlock of a mobile device using a side surface of the mobile terminal according to one embodiment of the present invention.

As shown in FIG. 26 (*a*), after a pattern input for unlock in up/down direction is successfully inputted on a side surface on the premise of explanation on the aforementioned drawings, a position of a last touch drag on a first touch screen 2620 of a mobile terminal 2600 is changed from a first position 2621 to a second position 2622. In particular, FIG. 26 (*a*) shows that a touch is performed in an inside direction on the basis of a user.

In this case, as shown in FIG. 26 (*b*), a second screen is unlocked and executes a quick menu function at the same time (2610→2611). Of course, although FIG. 26 shows the quick function as an example, changing the quick menu function to a specific function preferred by a user also belongs to the scope of right of the present invention. In particular, not only unlock of a display explained in the foregoing drawings but also a specific function is executed at the same time as unlock according to whether a direction in which a last drag ends corresponds to a left direction or a right direction. Embodiments explained in FIG. 23 and FIG. 24 are implemented on the basis of an initial touch point, whereas embodiments explained in FIG. 25 and FIG. 26 are implemented on the basis of a direction of a touch.

Figure 27:
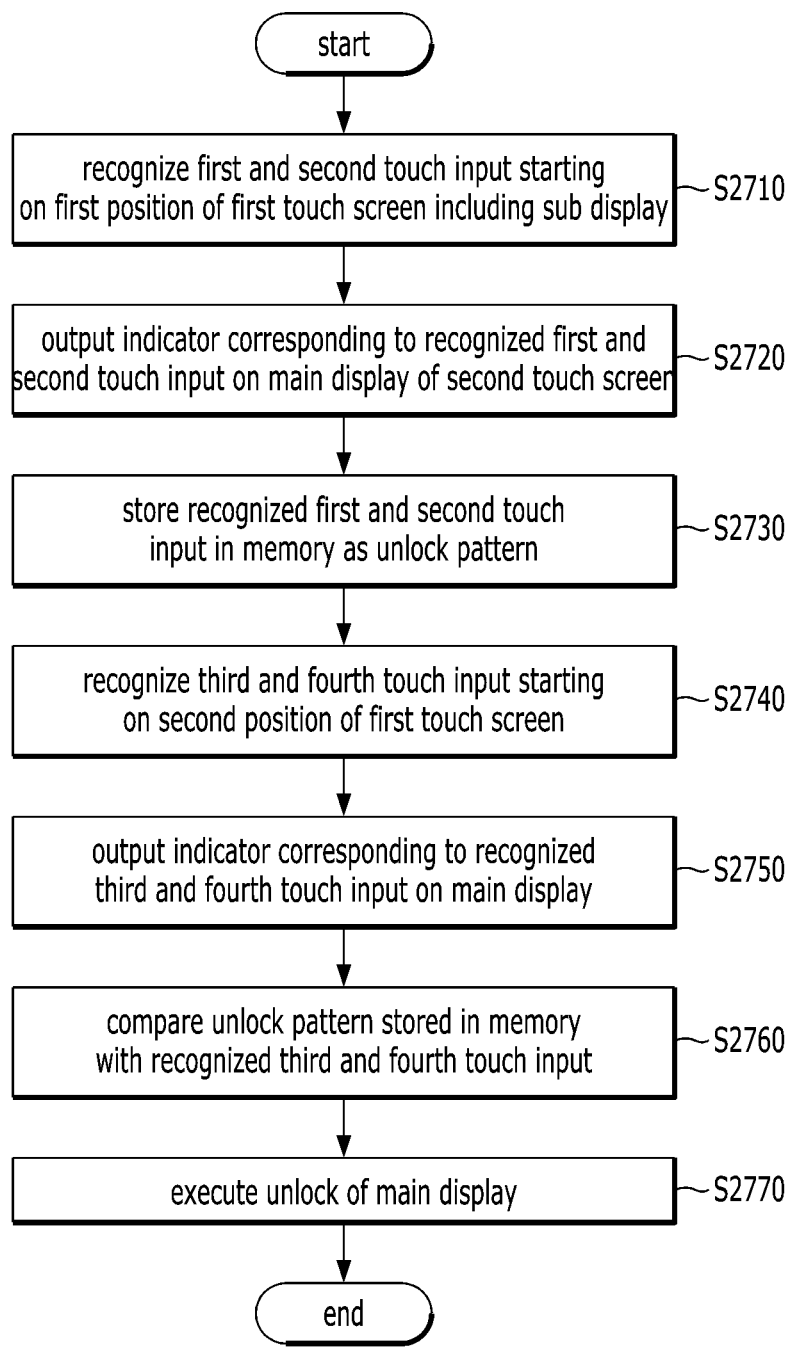
FIG. 27 is a flowchart for a method of controlling a mobile terminal according to one embodiment of the present invention.

FIG. 27 is a flowchart for a method of controlling a mobile terminal according to one embodiment of the present invention.

A method of controlling a mobile terminal according to one embodiment of the present invention starts from a step [S2710] of recognizing a first touch input and a second touch input starting on a first position of a first touch screen including a sub display.

An indicator corresponding to the recognized first touch input and the second touch input is outputted on a main display of a second touch screen [S2720]. For instance, the first touch input and the second touch input have directions different from each other.

The recognized first touch input and the second touch input are stored in a memory as a unlock pattern [S2730]. A third touch input and a fourth touch input starting on a second position of the first touch screen are recognized [S2740]. It is not mandatory that the first position and the second position are identical to each other.

An indicator corresponding to the recognized third touch input and the fourth touch input is outputted on the main display [S2750] and the pattern for unlock stored in the memory is compared with the recognized third touch input and the fourth touch input with each other [S2760].

And, unlock of the main display is designed to be executed according to a result of the comparison [S2770].

According to a different embodiment of the present invention, the recognized first touch input includes direction information and distance information and the recognized second touch input includes direction information and distance information. In this case, the direction information of the first touch input is directly opposite to the direction information of the second touch input. For instance, the distance information is divided into at least two or more units.

Moreover, as mentioned earlier in FIG. 20 to FIG. 22, if the third touch input is recognized on an end point of the first touch screen, the method of controlling the mobile terminal according to one embodiment of the present invention further includes a step of adding up distance information of a newly touched third-a touch input and distance information of the previously touched third touch input. Of course, if the fourth touch input is recognized on the end point of the first touch screen, the method of controlling the mobile terminal according to one embodiment of the present invention further includes a step of adding up distance information of a newly touched fourth-a touch input and distance information of the previously touched fourth touch input.

According to a further different embodiment of the present invention, if an application adjacent to the second position of the first touch screen is displayed on a main display of the second touch screen, the method further includes a step of generating a command for executing the application after unlock is executed and a step of executing the application based on the generated command.

Moreover, the method further includes a step of outputting the number of units corresponding to each distance information of the first to the fourth touch input on a first area of the main display and a step of outputting a progressive bar depending on each distance information of the first to the fourth touch input and the direction information on a second area of the main display. Regarding this, those who skilled in the related art can interpret it with reference to FIG. 14 and FIG. 15.

Figure 28:
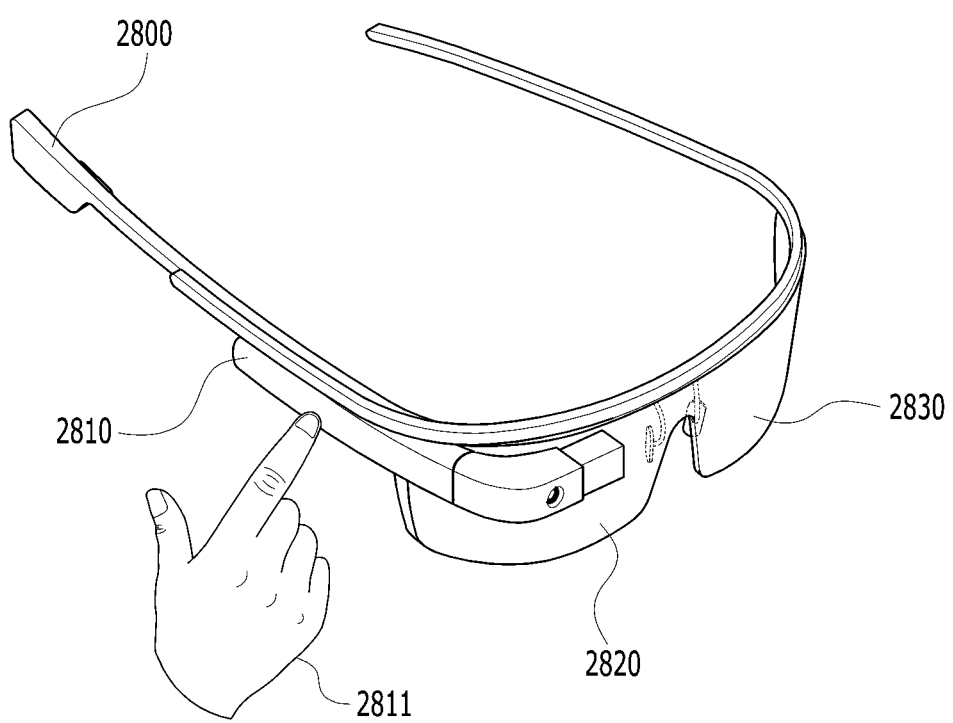
FIGS. 28 to 29 are diagrams for explaining a wearable device to which one embodiment of the present invention is applied.
Figure 29:
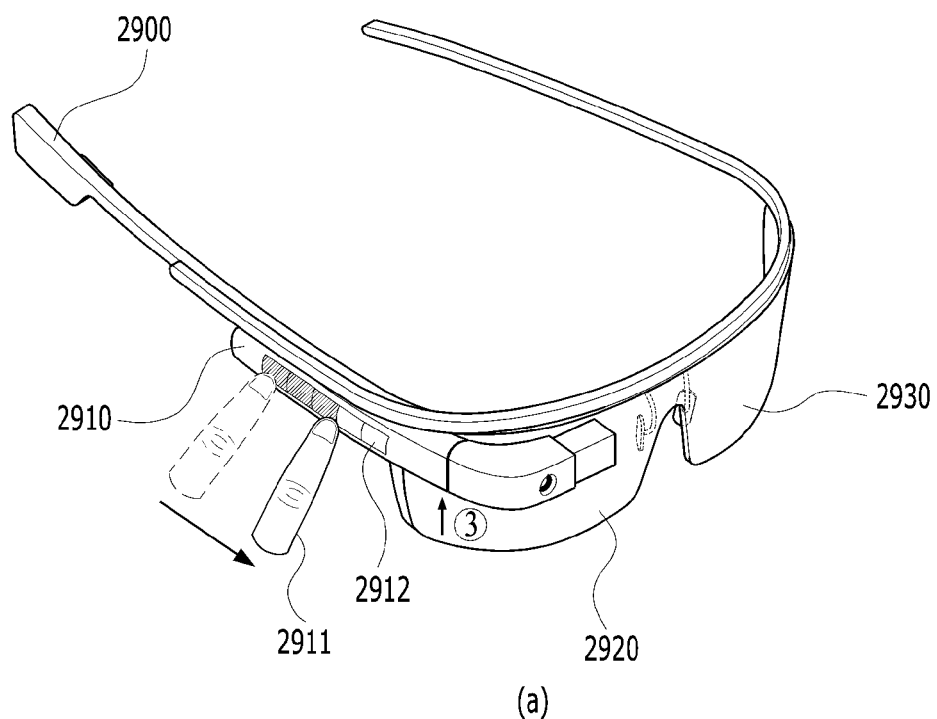
Figure 29:
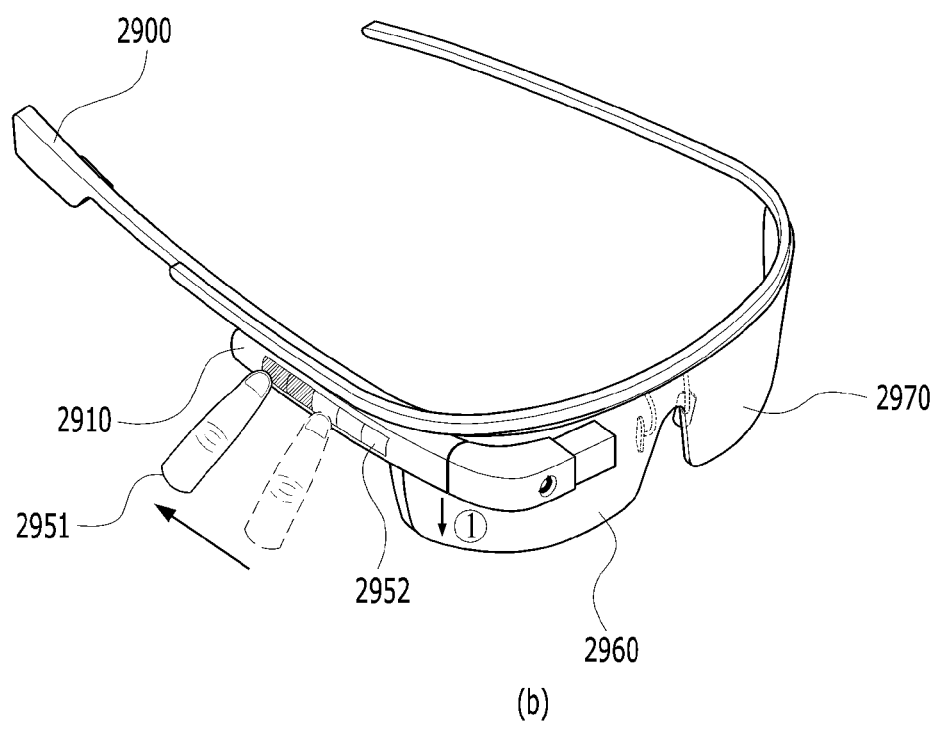

FIGS. 28 to 29 are diagrams for explaining a wearable device to which one embodiment of the present invention is applied. As mentioned earlier in FIG. 4, the present invention can be applied to a mobile terminal of a glasses type. Of course, a device shown in FIG. 28 to FIG. 29 is called a wearable device. For instance, the wearable device corresponds to a smart watch, a glasses, clothing or the like.

Since content mentioned earlier in FIG. 4 is applied to both FIG. 28 and FIG. 29, detail explanation is omitted at this time. As shown in FIG. 28, a mobile terminal 2800 of a glasses type includes two display modules 2820/2830 outputting image data in accordance with eyes. Moreover, the mobile terminal 2800 of the glasses type includes a side display equipped with a touch recognition sensor capable of recognizing a touch of a user 2811. In particular, the side display 2810 of the mobile terminal 2800 of the glasses type corresponds to the aforementioned first touch screen (720 in FIG. 7, 820 in FIG. 8, 920 in FIG. 9 and the like) including a sub display. Hence, contents mentioned earlier in previous drawings can be applied to FIG. 28 to FIG. 29 as it is.

As shown in FIG. 29 (a), a mobile terminal 2900 of a glasses type includes two main displays 2920/2930. Assume that the main displays 2920/2930 are locked.

In this case, if a touch 2911 of a user is recognized on a touch screen 2910 including a sub display, a graphic image 2912 indicating a touch direction of the user, moving distance and the like to unlock the main displays is displayed. As mentioned earlier in the previous drawings, the graphic image 2912 is designed to change according to a touch direction and a touch distance of the user. Moreover, a graphic image indicating a touch direction and a distance (in FIG. 29 (a), distance corresponding to 3 blocks in up direction) is also outputted on the main displays 2920/2930 at the same time or with a certain time difference. Hence, the user does not need to keep an eye on the touch screen 2910 including the sub display in a process of unlocking the display.

The content mentioned earlier in FIG. 29 (a) can also be applied to FIG. 29 (b) as it is. Yet, there is a difference between FIG. 29 (b) and FIG. 29 (a) in that a moving direction and a moving distance of a touch is different from each other.

As shown in FIG. 29 (b), if a touch 2951 of a user is recognized on a touch screen including a sub display, a graphic image 2952, which is changed according to a touch direction and a distance, is displayed on the touch screen. Moreover, a graphic image indicating a touch direction and a distance (in FIG. 29 (b), distance corresponding to 1 block in down direction) is also outputted on a main displays 2960/2970. Of course, although both FIG. 29 (a) and FIG. 29 (b) show an example that one of the two main displays outputs the graphic image only, it may make a first touch pattern to be displayed on a left glass (main display) only and a second touch pattern, which is inputted after the first touch pattern, to be displayed on a right glass only. By doing so, a user can more easily distinguish the two pattern from each other.

Meanwhile, as shown in FIGS. 29 (a) and (b), the graphic image 2912/2952 (e.g., the number of blocks), which is changed according to a touch of a user, is also displayed on the touch screen 2910 including the sub display. Yet, if the touch screen is designed in this way, there may exist a risk that third party can easily recognize a unlock pattern of a user.

Hence, according to a different embodiment of the present invention, the graphic image 2912/2952 is designed not to be displayed on the touching screen 2910 including the sub display. Instead, the graphic image is designed to be limitedly displayed on the main display (e.g., glass) (2920/2930 in FIG. 29 (a) or 2960/2970 in FIG. 29 (b)) only.

Figure 30:
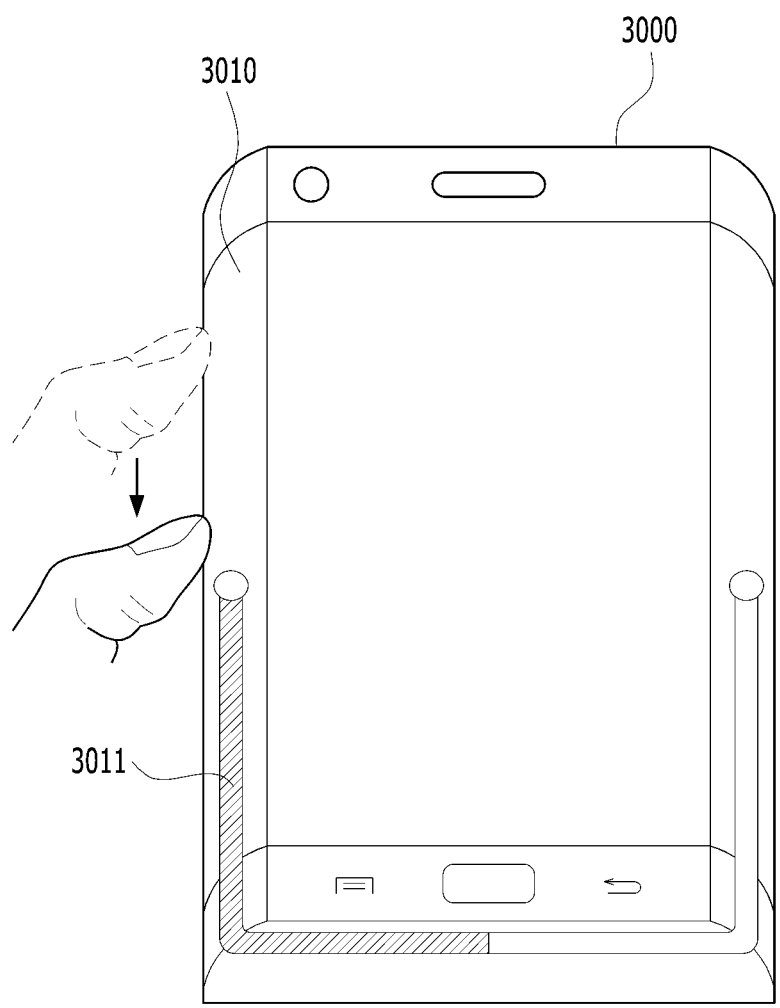
FIG. 30 is a diagram for explaining a different embodiment of FIG. 14 or FIG. 15.

FIG. 30 is a diagram for explaining a different embodiment of FIG. 14 or FIG. 15. According to FIG. 14 and FIG. 15, additional information of a graphic form is displayed on a main display to intuitively display a distance (the number of blocks) of a touch input.

On the contrary, a mobile terminal 3000 shown in FIG. 30 displays additional information 3011 of a graphic form on a sub display 3010. In particular, when an angle between a touch screen including a main display and a touch screen including a sub display is not a right angle, a technological effect of FIG. 30 is not trivial. For instance, it is not necessary for a user to consistently monitor the main display in a unlock process. As mentioned earlier in FIG. 14 and FIG. 15, the additional information 3011 of the graphic form is designed to change in real time according to a touch direction and a distance of a user.

The present invention mentioned in the foregoing description can be implemented by codes readable by a computer in media in which a program is recorded. Media readable by a computer includes all kinds of recording devices in which data readable by a computer system is stored. Examples of the media readable by a computer include a HDD (hard disk drive), an SSD (solid state disk), an SDD (silicon disk drive), a ROM, a RAM, a CD-ROM, a magnetic tape, a floppy disk, an optical data storing device and the like. And, the media can be implemented in a form of a carrier wave (e.g., transmission via the internet). And, the computer may include a controller 180 of a terminal. While the present specification has been described and illustrated herein with reference to the preferred embodiments and diagrams thereof, the present specification may be non-limited to the aforementioned embodiments and it will be apparent to those skilled in the art that various modifications and variations can be made therein without departing from the spirit and scope of the present specification. Thus, it is intended that the present specification covers the modifications and variations of this invention that come within the scope of the appended claims and their equivalents.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of controlling a mobile terminal, comprising:
   recognizing a first touch input and a second touch input at a first touch screen, the first touch input to start at a first position on the first touch screen;

outputting, from the second touch screen, an indicator corresponding to the recognized first touch input and the second touch input, wherein the first touch screen has a different direction than the second touch screen, and the second touch screen corresponds to a main screen of the mobile terminal;

storing, in a memory, an unlock pattern based on the recognized first touch input and the second touch input;

recognizing a third touch input and a fourth touch input at the first touch screen, the third touch input to start at a second position on the first touch screen;

outputting, from the second touch screen, an indicator corresponding to the recognized third touch input and the fourth touch input;

comparing the stored unlock pattern with the recognized third touch input and the fourth touch input; and executing an unlock of the main display based on a result of the comparing, wherein in response to recognizing the third touch input at an end point of the first touch screen, the method further comprising adding distance information of a newly touched third touch input and distance information of a previously touched third touch input.

2. The method of claim 1, wherein the recognized first touch input includes direction information and distance information of the first touch input, the recognized second touch input includes direction information and distance information of the second touch input, and wherein the direction information of the first touch input is opposite to the direction information of the second touch input.

3. The method of claim 1, wherein the second position on the first touch screen is different than the first position on the first touch screen.

4. The method of claim 1, wherein in response to recognizing the fourth touch input at the end point of the first touch screen, the method further comprising adding distance information of a newly touched fourth touch input and distance information of a previously touched fourth touch input.

5. The method of claim 1, in response to display of an application at the first touch screen at a position adjacent to the second position on the first touch screen, the method further comprising:
generating a command for executing the application after the executing of the unlock of the main display; and
executing the application based on the generated command.

6. The method of claim 2, further comprising:
outputting, on a first area of the first touch screen, a total number of units corresponding to the distance information of the first touch input;
outputting, on the first area of the first touch screen, a total number of units corresponding to the distance information of the second touch input on the first area of the first touch screen; and
outputting, on a second area of the second touch screen, a progressive bar based on the distance information and the direction information of the first touch input and the distance information and the direction information of the second touch input.

7. The method of claim 1, wherein an angle between the first touch screen and the second touch screen is greater than 0 degree and less than 90 degrees.

8. A mobile terminal comprising:
a first touch screen corresponding to a sub display;
a second touch screen corresponding to a main display, wherein the first touch screen has a different direction than the second touch screen;
a touch recognition sensor configured to recognize a first touch input and a second touch input on the first touch screen, the first touch input to start at a first position on the first touch screen, and to recognize a third touch input and a fourth touch input on the first touch screen, the third touch input to start at a second position on the first touch screen;
a memory configured to store an unlock pattern based on the recognized first touch input and the second touch input; and
a controller configured to compare the stored unlock pattern with the recognized third touch input and the fourth touch input, and to execute an unlock of the main display based on a result of the comparison,
wherein when the touch recognition sensor recognizes the third touch input at an end point of the first touch screen. the controller is configured to add distance information of a newly touched third touch input and distance information of a previously touched third touch input.

9. The mobile terminal of claim 8, wherein the recognized first touch input includes direction information and distance information of the first touch input, the recognized second touch input includes direction information and distance information of the second touch input, and wherein the direction information of the first touch input is opposite to the direction information of the second touch input.

10. The mobile terminal of claim 8, wherein the second position on the first touch screen is different than the first position on the first touch screen.

11. The mobile terminal of claim 8, wherein when the touch recognition sensor recognizes the fourth touch input at the end point of the first touch screen, the controller is configured to add distance information of a newly touched fourth touch input and distance information of a previously touched fourth touch input.

12. The mobile terminal of claim 8, wherein when an application is displayed on the second touch screen adjacent to the second position on the first touch screen, the controller is configured to execute the application after the unlock of the main display is executed or at a same time as the unlock of the main display.

13. The mobile terminal of claim 8, wherein the controller is configured to output, on a first area of the second touch screen, a total number of units corresponding to the distance information of the first touch input, to output, on the first area of the second touch screen, a total number of units corresponding to the distance information of the second touch input, and to output, on a second area of the second touch screen, a progressive bar based on the distance information and the direction information of the first touch input and the distance information and the direction information of the second touch input.

14. An apparatus comprising:
a first touch screen;
a second touch screen;
a touch recognition sensor to sense inputs at the first touch screen and the second touch screen; and
a controller to receive first information from the touch recognition sensor relating to a first touch and a subsequent second touch at the first touch screen, and the controller to store the first information in a memory as unlock information, the controller to receive second information from the touch recognition sensor relating to a third touch and a subsequent fourth touch at the first touch screen, and the controller to compare the stored first information with the second information, and to execute an unlock of the second touch screen based on a result of the comparison,
wherein in response to the third touch being at an end point of the first touch screen, the controller is to combine distance information of a newly touched third touch and distance information of a previously touched third touch.

15. The apparatus of claim 14, wherein the first information includes direction information and distance information of the first touch and direction information and distance information of the second touch, and wherein a direction of the first touch is different than a direction of the second touch.

16. The apparatus of claim 14, wherein the controller controls the second touch screen to display the second information related to the first touch and the second touch.

17. The apparatus of claim 14, wherein when an application is displayed on the second touch screen adjacent to a start position of the first touch at the first touch screen, the controller is to execute the application after the unlock of the second touch screen is executed or at a same time as the unlock of the second touch screen.

* * * * *